(12) United States Patent
Fujiwara et al.

(10) Patent No.: US 7,685,435 B2
(45) Date of Patent: Mar. 23, 2010

(54) PROGRAM DEVELOPMENT METHOD, PROGRAM DEVELOPMENT SUPPORTING SYSTEM, AND PROGRAM INSTALLATION METHOD

(75) Inventors: Makoto Fujiwara, Kyoto (JP); Yusuke Nemoto, Hyogo (JP); Junichi Yasui, Osaka (JP); Takuji Maeda, Osaka (JP); Takayuki Ito, Osaka (JP); Yasushi Yamada, Aichi (JP); Shinji Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 1456 days.

(21) Appl. No.: 10/624,481

(22) Filed: Jul. 23, 2003

(65) Prior Publication Data

US 2004/0153657 A1 Aug. 5, 2004

(30) Foreign Application Priority Data

Jul. 24, 2002 (JP) ............................. 2002-215096

(51) Int. Cl.
*G06F 11/30* (2006.01)

(52) U.S. Cl. ..................................... 713/191
(58) Field of Classification Search ................ 713/191, 713/193; 726/34
See application file for complete search history.

(56) References Cited

U.S. PATENT DOCUMENTS

| | | | |
|---|---|---|---|
| 4,218,738 A * | 8/1980 | Matyas et al. ................. 705/72 |
| 4,864,615 A * | 9/1989 | Bennett et al. ............... 380/239 |
| 4,941,176 A | 7/1990 | Matyas et al. |
| 5,307,497 A * | 4/1994 | Feigenbaum et al. ........... 713/1 |
| 5,666,411 A | 9/1997 | McCarty |
| 5,771,287 A * | 6/1998 | Gilley et al. ................. 713/191 |
| 5,812,671 A * | 9/1998 | Ross, Jr. ...................... 713/153 |
| 5,835,911 A | 11/1998 | Nakagawa et al. |
| 5,892,900 A | 4/1999 | Ginter et al. |
| 5,915,025 A | 6/1999 | Taguchi et al. |
| 5,999,629 A | 12/1999 | Heer et al. |
| 6,134,659 A | 10/2000 | Sprong et al. |
| 6,226,618 B1 * | 5/2001 | Downs et al. ................. 705/1 |

(Continued)

FOREIGN PATENT DOCUMENTS

CN 1279861 A 1/2001

(Continued)

OTHER PUBLICATIONS

Japanese Office Action issued in corresponding Japanese Patent Application No. 2002-215096 dated Mar. 6, 2007.

(Continued)

*Primary Examiner*—Jung Kim
*Assistant Examiner*—Samson B Lemma
(74) *Attorney, Agent, or Firm*—McDermott Will & Emery LLP

(57) ABSTRACT

An development environment of a high security level is provided for a key-installed system. Development of a program for a system having an LSI device which includes a secure memory is performed by providing another LSI device having the same structure and setting the provided LSI device to a development mode which is different from a product operation mode. Alternatively, the provided LSI device is set to an administrator mode to perform development and encryption of a key-generation program. The LSI device is set to a key-generation mode to execute the encrypted key-generation program, thereby generating various keys.

12 Claims, 22 Drawing Sheets

U.S. PATENT DOCUMENTS

| | | |
|---|---|---|
| 6,324,647 B1 | 11/2001 | Bowman-Amuah |
| 6,333,983 B1 | 12/2001 | Enichen et al. |
| 6,367,019 B1 | 4/2002 | Ansell et al. |
| 6,421,779 B1 * | 7/2002 | Kuroda et al. ............... 713/169 |
| 6,530,025 B1 | 3/2003 | Nakagawa et al. |
| 6,577,734 B1 | 6/2003 | Etzel et al. |
| 6,799,277 B2 | 9/2004 | Colvin |
| 6,834,111 B1 * | 12/2004 | Nishimura et al. .......... 380/255 |
| 6,857,067 B2 | 2/2005 | Edelman |
| 6,957,335 B2 | 10/2005 | Foster et al. |
| 6,970,565 B1 | 11/2005 | Rindsberg |
| 6,988,199 B2 | 1/2006 | Toh et al. |
| 6,990,582 B2 | 1/2006 | Maruyama |
| 7,003,107 B2 | 2/2006 | Ananth |
| 7,051,211 B1 | 5/2006 | Matyas et al. |
| 7,062,718 B2 * | 6/2006 | Kodosky et al. ............ 715/771 |
| RE39,166 E * | 7/2006 | Gammie ..................... 380/228 |
| 7,082,539 B1 | 7/2006 | Kitahara et al. |
| 7,110,984 B1 | 9/2006 | Spagna et al. |
| 7,117,352 B1 * | 10/2006 | Giles et al. ..................... 713/2 |
| 7,133,524 B2 | 11/2006 | Fujiwara et al. |
| 7,167,564 B2 * | 1/2007 | Asano et al. ................ 380/279 |
| 7,174,568 B2 | 2/2007 | Chatani et al. |
| 7,194,090 B2 | 3/2007 | Muratani et al. |
| 7,219,227 B2 | 5/2007 | Hori et al. |
| 7,299,203 B1 * | 11/2007 | Nelson ......................... 705/28 |
| 7,310,731 B2 | 12/2007 | Ishibashi et al. |
| 2001/0056539 A1 * | 12/2001 | Pavlin et al. ................ 713/193 |
| 2002/0002466 A1 | 1/2002 | Kambayashi et al. |
| 2002/0021804 A1 | 2/2002 | Ledzius et al. |
| 2002/0048367 A1 | 4/2002 | Maillard |
| 2002/0078380 A1 * | 6/2002 | Lin et al. .................... 713/201 |
| 2002/0083330 A1 | 6/2002 | Shiomi et al. |
| 2002/0116625 A1 | 8/2002 | Sato |
| 2002/0116632 A1 | 8/2002 | Itoh et al. |
| 2002/0129245 A1 | 9/2002 | Cassagnol et al. |
| 2002/0174264 A1 | 11/2002 | Fuller et al. |
| 2002/0184512 A1 | 12/2002 | Cardoso, Jr. |
| 2003/0056107 A1 | 3/2003 | Cammack et al. |
| 2003/0217193 A1 * | 11/2003 | Thurston et al. ............ 709/321 |
| 2009/0037721 A1 | 2/2009 | Fujiwara et al. |

FOREIGN PATENT DOCUMENTS

| | | |
|---|---|---|
| CN | 1302399 | 7/2001 |
| CN | 1307284 A | 8/2001 |
| CN | 1342007 | 3/2002 |
| EP | 0 718 756 A1 | 6/1996 |
| EP | 1 083 480 A1 | 3/2001 |
| EP | 1 119 131 A2 | 7/2001 |
| EP | 1 126 355 A1 | 8/2001 |
| EP | 1 202 150 A2 | 5/2002 |
| EP | 1 217 850 A1 | 6/2002 |
| GB | 2 336 005 A | 10/1999 |
| JP | 04-350731 | 12/1992 |
| JP | 11-259330 | 9/1999 |
| JP | 11-282667 | 10/1999 |
| JP | 2000-122931 | 4/2000 |
| JP | 2000-347847 | 12/2000 |
| JP | 2000-347852 | 12/2000 |
| JP | 2001-211149 | 8/2001 |
| JP | 2002-251326 | 9/2002 |
| JP | 2002-279376 | 9/2002 |
| JP | P2003-101527 A | 4/2003 |
| JP | 2004-54834 | 2/2004 |
| WO | WO 00/57258 | 9/2000 |
| WO | WO 00/57290 A1 | 9/2000 |
| WO | WO 0057278 A1 | 9/2000 |

OTHER PUBLICATIONS

Partial European Search Report, issued in the corresponding Patent Application No. 03016912.2-2211, dated on Oct. 22, 2007.

Michael P. Ressler, "Security Sensitive Software Development," ICCST, Zurich, Switzerland, 1989, pp. 89-91.

U.S. Appl. No. 10/696,621, filed Oct. 30, 2003 to Makoto Fujiwara et al., entitled "Program Update Method and Server".

U.S. Appl. No. 11/798,367, filed May 14, 2007 to Makoto Fujiwara et al., entitled "Program Update Method and Server".

Japanese Office Action with English translation issued in corresponding Japanese Patent Application No. 2002-331992, dated Apr. 3, 2007.

U.S. Office Action issued in U.S. Appl. No. 10/696,621, dated Jul. 30, 2007.

European Office Action, issued in European Patent Application No. EP 08167396.4-2211 dated on Feb. 6, 2009.

Japanese Notice of Reasons for Rejection, w/ English translation thereof, issued in Japanese Patent Application No. JP 2007-121815 dated Mar. 3, 2009.

Japanese Office Action, with English translation, issued in Japanese Patent Application No. 2009-112759, dated Sep. 15, 2009.

* cited by examiner

PROGRAM DEVELOPMENT METHOD, PROGRAM DEVELOPMENT SUPPORTING SYSTEM, AND PROGRAM INSTALLATION METHOD

BACKGROUND OF THE INVENTION

The present invention relates to a technology including a key-installed (key-implemented) system, and development and installation of a program for an LSI device used in such a system.

In a key-installed system having high secrecy and confidentiality, how to maintain the security of the system in program development and program installation processes is a significant challenge.

SUMMARY OF THE INVENTION

The present invention provides to such a key-installed system, high-security program development method and environment and a high-security program installation method.

Specifically, the present invention provides a method for developing a program which is to be installed in a system having an LSI device. The LSI device has a secure memory including an unrewritable area. The method comprises the steps of providing an LSI device having the same structure as that of the LSI device; setting the provided LSI device to a development mode so that the provided LSI device is used as a development LSI device, the development mode being different from a product operation mode employed at the times of program installation and product operation; and developing the program on the development LSI device.

According to this method invention, development of a program which is to be installed in a system having an LSI device which includes a secure memory is performed in a development LSI device which has the same structure as that of the LSI device and which has been set to a development mode that is different from a product operation mode employed at the times of program installation and product operation. That is, the operation mode of an LSI device which has a secure memory including an unrewritable area and which has high confidentiality is switched from an installation mode to the development mode so that the LSI device is used as a program development environment. As a result, the security of the program development environment is improved as compared with conventional techniques.

In the program development method of the present invention, the operation of the LSI device is preferably restricted such that when being set to the development mode, the LSI device can execute a raw (binary) program, and when being set to the product operation mode, the LSI device cannot execute a raw (binary) program.

The program development method of the present invention preferably includes the step of encrypting the program developed on the development LSI device at the program development step.

In the program development method of the present invention, the operation of the LSI device is preferably restricted such that when being set to the development mode, the LSI device cannot generate a key for encrypting a raw (binary) program.

The program development method of the present invention preferably includes the steps of: providing an LSI device having the same structure as that of the LSI device; setting the provided LSI device to a key-generation mode so that the provided LSI device is used as an key-generation LSI device, the key-generation mode being different from the development mode and an installation mode; and installing an encrypted key-generation program in the key-generation LSI device and executing the key-generation program to generate a key. Furthermore, the operation of the LSI device is preferably restricted such that when being set to the key-generation mode, the LSI device cannot execute a raw (binary) program.

Alternatively, the program development method of the present invention preferably includes the steps of: providing an LSI device having the same structure as that of the LSI device; setting the provided LSI device to an administrator mode so that the provided LSI device is used as an administrator LSI device, the administrator mode being different from the development mode, the installation mode, and the key-generation mode; and developing the key-generation program and encrypting the developed key-generation program with any key on the administrator LSI device.

Furthermore, the present invention provides a program development supporting system for supporting development of an encrypted program. The system includes: an LSI device having the same structure as that of an LSI device on which the encrypted program runs; and an external memory for storing a raw (binary) program. The LSI device includes a secure memory for storing common key information regarding a raw common key. The LSI device is capable of executing a first step of obtaining the raw common key from the common key information stored in the secure memory, and a second step of encrypting the raw (binary) program input from the external memory using the raw common key.

According to this system invention, an LSI device having the same structure as that of an LSI device on which an encrypted program to be developed runs is provided as a development environment. In this LSI device, a raw common key is obtained from common key information stored in a secure memory, and a raw (binary) program input from an external memory is encrypted using the raw common key. That is, decryption into the raw common key and encryption of the raw (binary) program with the raw common key can be performed. Thus, encryption of a raw (binary) program can be performed while keeping the raw common key secret from a program developer.

Furthermore, the present invention provides a program development supporting system for supporting development of an encrypted program. The system includes: an LSI device; and an external memory for storing a raw (binary) program. The LSI device includes a secure memory for storing common key information regarding a raw common key, and a boot ROM for storing a boot program. By executing the boot program stored in the boot ROM, the LSI device executes a first step of obtaining a raw common key from the common key information stored in the secure memory, and a second step of encrypting the raw (binary) program input from the external memory using the raw common key.

According to this system invention, by executing a boot program in an LSI device, a raw common key is obtained from common key information stored in a secure memory, and a raw (binary) program input from an external memory is encrypted using the raw common key. That is, decryption into the raw common key and encryption of the raw (binary) key with the raw common key are performed not by an external instruction but by the boot program. Thus, encryption of the raw (binary) program can be performed while surely keeping the raw common key secret from a program developer.

In the program development supporting system of the present invention, the common key information preferably includes an encrypted common key which is obtained by encrypting the raw common key with a raw first intermediate key and an encrypted first intermediate key which is obtained by encrypting the raw first intermediate key with a second intermediate key. The first step preferably includes the step of obtaining the raw common key using the encrypted common key, the encrypted first intermediate key and a program encryption seed.

Furthermore, the present invention provides a method for installing an encrypted program in a key-installed system which includes an external memory and an LSI device having a secure memory. The method includes: an initial value setting procedure for storing common key information regarding a raw common key and inherent key information regarding a raw inherent key in the secure memory; a first step of obtaining in the LSI device the raw common key from the common key information stored in the secure memory; a second step of decrypting in the LSI device a common key-encrypted program supplied from the external memory into a raw (binary) program using the raw common key obtained at the first step; a third step of obtaining in the LSI device the raw inherent key from the inherent key information stored in the secure memory; a fourth step of encrypting in the LSI device the raw (binary) program obtained at the second step using the raw inherent key obtained at the third step, thereby obtaining an inherent key-encrypted program; and the step of installing the inherent key-encrypted program obtained at the fourth step in the external memory.

According to this method invention, a common key-encrypted program supplied to an LSI device is decrypted using a raw common key obtained from common key information stored in a secure memory, thereby obtaining a raw (binary) program. The obtained raw (binary) program is encrypted using a raw inherent key obtained from inherent key information stored in the secure memory. That is, before being installed in a system, the common key-encrypted program is converted to an inherent key-encrypted program by switching the key for encryption from the common key to the inherent key. As a result, programs installed in different products of users are programs encrypted with different inherent keys, and thus, the confidentiality is improved. Furthermore, even if a cipher (encryption) is broken, the number of products to be damaged is restricted, and therefore, the security is improved as compared with conventional techniques.

In the program installation method of the present invention, the LSI device preferably includes a boot ROM for storing a boot program, and the LSI device preferably executes the boot program stored in the boot ROM, thereby executing the first to fourth steps.

In the program installation method of the present invention, the inherent key information is preferably stored in an unrewritable area of the secure memory.

In the program installation method of the present invention, the common key information preferably includes an encrypted common key which is obtained by encrypting the raw common key with a raw first intermediate key and an encrypted first intermediate key which is obtained by encrypting the raw first intermediate key with a second intermediate key. The first step preferably includes the step of obtaining the raw common key using the encrypted common key, the encrypted first intermediate key and a program encryption seed.

In the program installation method of the present invention, the inherent key information preferably includes an encrypted inherent key which is obtained by encrypting the raw inherent key with a raw first intermediate key and an encrypted first intermediate key which is obtained by encrypting the raw first intermediate key with a second intermediate key. The third step preferably includes the step of obtaining the raw inherent key using the encrypted inherent key, the encrypted first intermediate key and a program encryption seed.

In the program installation method of the present invention, the inherent key information is preferably an inherent ID which is inherent to the LSI device.

DESCRIPTION OF THE PREFERRED EMBODIMENTS

Hereinafter, an embodiment of the present invention is described with reference to the drawings. Note that, in the following descriptions, an encrypted key or program which is obtained by encrypting a key or program X using a key Y is represented as "Enc (X, Y)".

Figure 1:
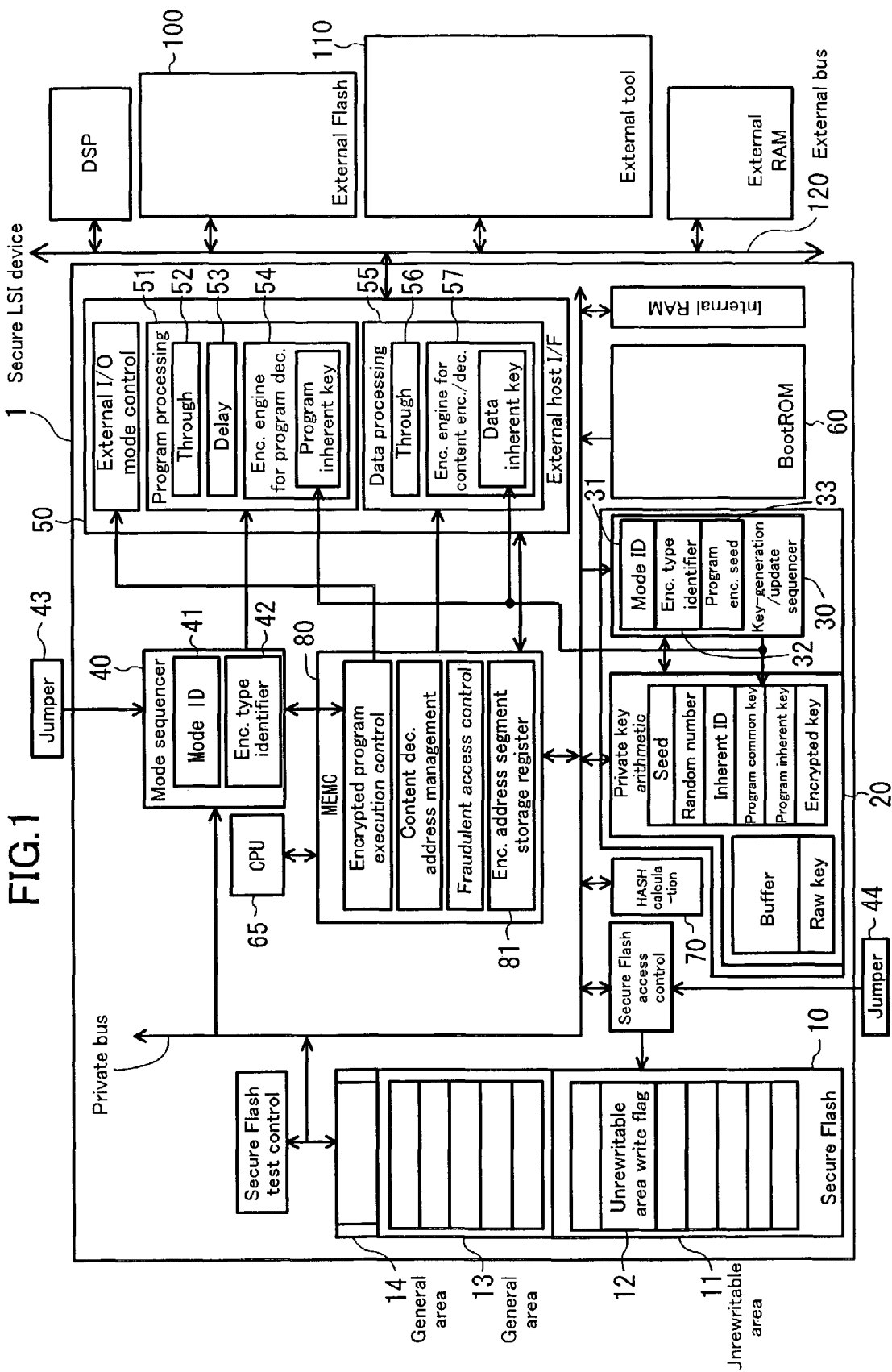
FIG. 1 is a block diagram showing a structure of a secure LSI device according to an embodiment of the present invention.

FIG. 1 is a block diagram showing an internal structure of a secure LSI device according to the present embodiment. In FIG. 1, the secure LSI device 1 can be connected to an external memory (flash memory) 100, an external tool 110, or the like, through an external bus 120. The operation mode of the secure LSI device 1 can be set by supplying a mode ID to the secure LSI device 1.

Major components of the secure LSI device 1, which are relevant to the following descriptions, are briefly described.

The secure LSI device 1 has a secure memory (e.g., secure Flash) 10 including an unrewritable area 11. The unrewritable area 11 includes an unrewritable area write flag 12. When a mode ID is once written in the secure memory 10, the flag value of the unrewritable area write flag 12 is changed from "WRITABLE" to "WRITTEN", and writing in the unrewritable area 11 is thereafter prohibited. It should be noted that the secure memory 10 and the external memory 100 are made of flash memories in the present embodiment, but the present invention is not limited thereto. Any type of memory may be used so long as it is nonvolatile.

A private key arithmetic processing section 20 includes registers for storing various keys and a program encryption seed and performs encryption processing. A key-generation/update sequencer 30 includes a mode ID storage register 31. The key-generation/update sequencer 30 controls the operation of the private key arithmetic processing section 20, i.e., whether or not various keys can be generated, according to a mode ID stored in the mode ID storage register 31. The key-generation/update sequencer 30 further includes an encryption type identifier storage register 32 for storing an encryption type identifier. The encryption type identifier indicates what algorithm and key length are used for encrypting a key or program. Furthermore, a program encryption seed 33 is installed in the key-generation/update sequencer 30.

A mode sequencer 40 also includes a mode ID storage register 41. The mode sequencer 40 controls the operation of an external host interface (I/F) 50, i.e., which interface is used for reading a program or data stored in the external memory 100, according to a mode ID stored in the mode ID storage register 41 and the value of a jumper 43. With this arrangement, it is possible to control whether or not a raw (binary) program stored in the external memory 100 can be executed. The mode sequencer 40 further includes an encryption type identifier storage register 42 for storing an encryption type identifier. The encryption type identifier indicates what method is used for encrypting a key.

The external host I/F 50 transmits/receives a program or data to/from the external memory 100 or the external tool 110 through one of a through section 52, a delay section 53 and an encryption engine 54 for program decryption, which are included in a program processing section 51, and a through section 56 and an encryption engine 57 for content encryption/decryption, which are included in a data processing section 55, according to the control by the mode sequencer 40.

A program input through the through section 52 is not executed inside the secure LSI device 1 except when the secure LSI device 1 is in an administrator mode (described later). That is, the through section 52 is activated when a raw (binary) program is encrypted or when an already-encrypted program is encrypted again using another key. The secure LSI device 1 is structured such that the operation of the secure LSI device 1 does not proceed to a program which is input through the through section 52 except when the secure LSI device 1 is in an administrator mode (described later). Therefore, for example, even when the secure LSI device 1 completed as a commercial product reads a raw (binary) program through the through section 52, the secure LSI device 1 cannot execute the raw (binary) program. It should be noted that, in order to execute a raw (binary) program, the secure LSI device 1 reads the raw (binary) program through the delay section 53.

A boot ROM 60 stores a boot program for controlling the boot-up operation of the secure LSI device 1. A HASH calculation section 70 calculates a HASH value for verifying the validity of a program read into the secure LSI device 1.

Further, the external memory 100 stores programs and contents. The external tool 110 stores various initial values which are to be transferred to and stored in the secure memory 10 at the time of the first boot-up of the secure LSI device 1. The type of the initial value varies depending on a selected operation mode.

Figure 2:
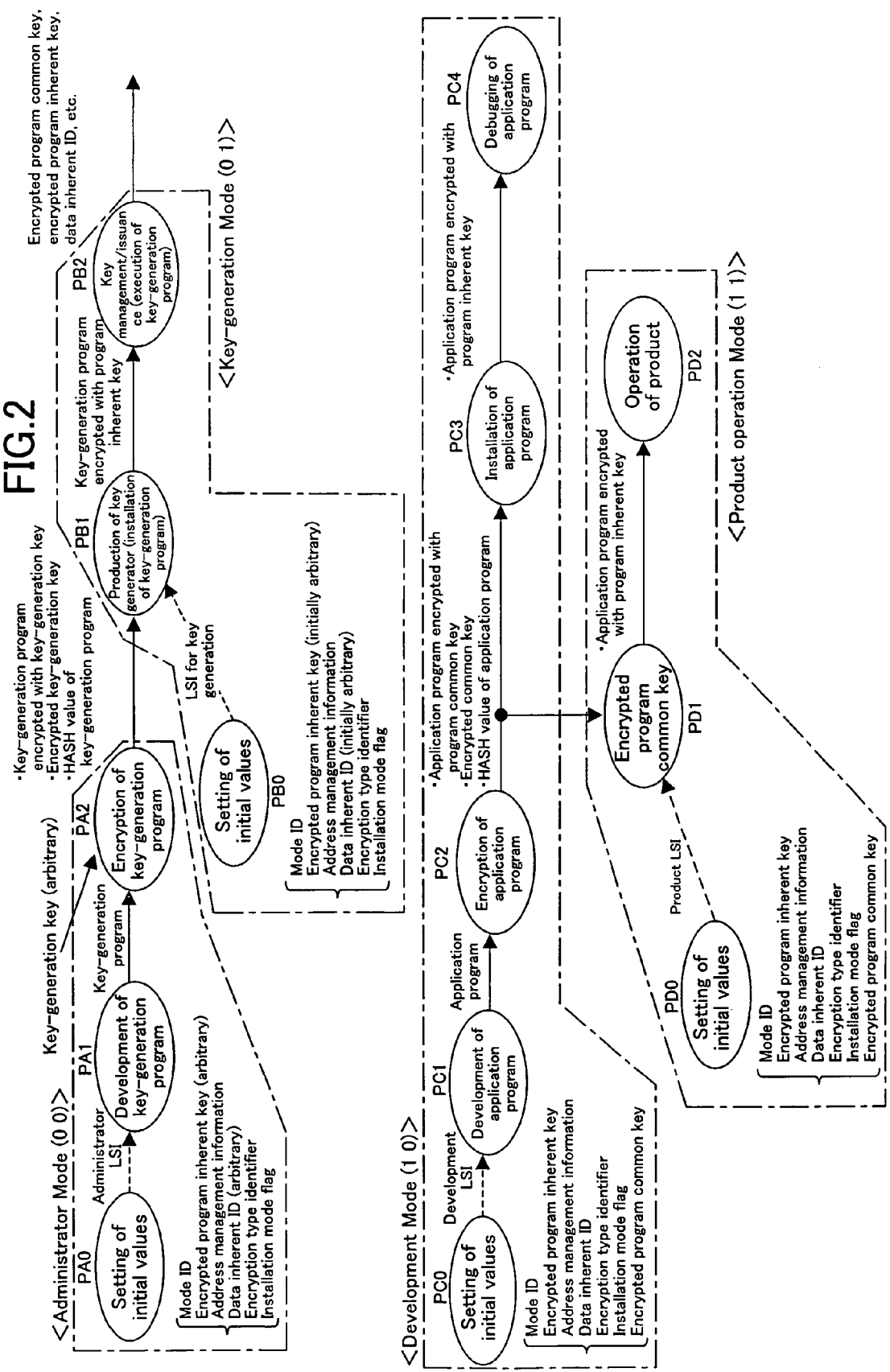
FIG. 2 illustrates an entire flow of development and manufacture which use the secure LSI device of FIG. 1.

FIG. 2 shows the entire flow of development and manufacture which use the secure LSI device 1 of FIG. 1. As shown in FIG. 2, the secure LSI device 1 operates in the following four operation modes: administrator mode (mode ID: 00), key-generation mode (mode ID: 01), development mode (mode ID: 10), and product operation mode (mode ID: 11).

When being set to the administrator mode, the secure LSI device 1 operates as an LSI device for an administrator (hereinafter, referred to as "administrator LSI device"). In the administrator LSI device, a key-generation program is developed, and the developed key-generation program is encrypted using any key-generation key.

When being set to the key-generation mode, the secure LSI device 1 operates as an LSI device for key generation (hereinafter, referred to as "key-generation LSI device"). In the key-generation LSI device, the encrypted key-generation program generated in the administrator LSI device is installed, and the key-generation program is executed to generate various keys.

When being set to the development mode, the secure LSI device 1 operates as an LSI device for development (hereinafter, referred to as "development LSI device").

In the development LSI device, an application program which is to be executed in an actual product is developed. The application program is encrypted using the program common key.

When being set to the product operation mode, the secure LSI device 1 operates as an actual product LSI device. The application program generated in the development LSI device and encrypted with the program common key is installed in the product LSI device for development. Inside the product LSI device, the installed application program is converted to an application program encrypted with a program inherent key. This conversion processing can be executed also in the development LSI device for the purpose of debugging the application program.

Hereinafter, details of the operation of the secure LSI device 1 are described for each operation mode with reference to flowcharts and dataflows. The secure LSI device 1 operates as described below by executing the boot program stored in the boot ROM 60.

Figure 3:
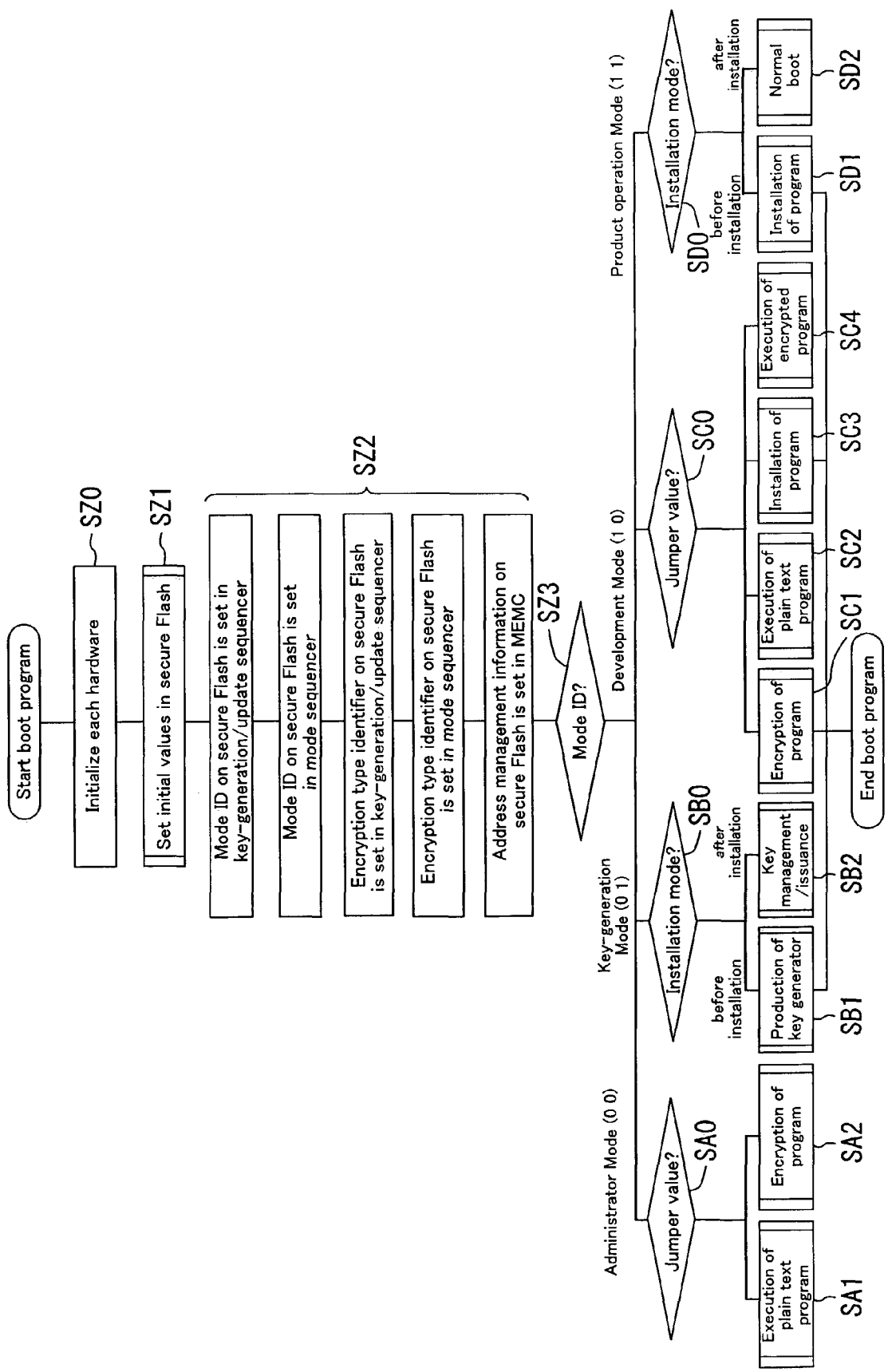
FIG. 3 is a flowchart of an entire process flow of a boot program.

FIG. 3 is a flowchart illustrating the entire process of the boot program.

When the secure LSI device 1 is powered on, the boot program stored in the boot ROM 60 is executed by a CPU 65. Referring to FIG. 3, each hardware is first initialized (SZ0). Then, various initial values are read from the external tool 110 and set in the secure memory 10 (SZ1).

Figure 22:
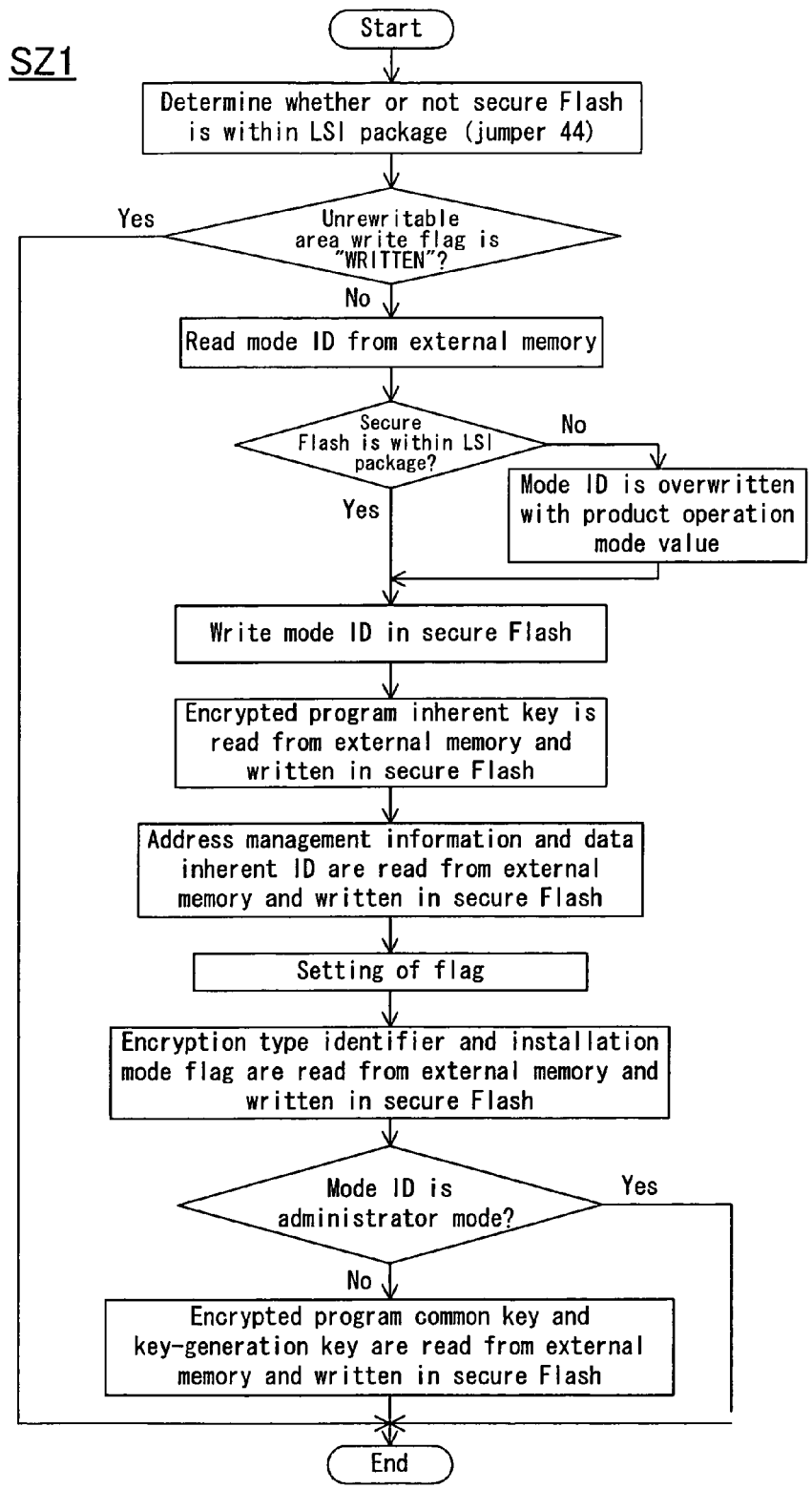
FIG. 22 is a flowchart of initial value setting processing SZ1.

FIG. 22 is a flowchart which illustrates the initial value setting processing SZ1. In the first place, at a jumper 44, it is determined whether or not the secure memory 10 is mounted in the LSI device. Next, it is determined whether or not the unrewritable area write flag 12 indicates "WRITTEN". When it indicates "WRITTEN", the processing SZ1 is ended because an initial value is already set in the secure memory 10. When the unrewritable area write flag 12 indicates "WRITABLE", initial values are written in the secure memory 10. In addition to the mode ID, an encrypted program inherent key, address management information and data inherent key are written in the unrewritable area 11 of the secure memory 10. If the first determination indicates that the secure memory 10 exists outside the LSI device, the mode ID is overwritten with a value that indicates the product operation mode. As a result, a fraudulent product which has a secure memory 10 outside its LSI package operates only when it is in the product operation mode.

Next, the unrewritable area write flag 12 is set to "WRITTEN", whereby rewriting in the unrewritable area 11 is thereafter prohibited. Further, an encryption type identifier and an installation mode flag are written in general areas 13 and 14. When the mode ID indicates a mode other than the administrator mode, an encrypted common key and key-generation key is written in the general areas 13 and 14 in addition to the encryption type identifier and installation mode flag.

Figure 4:
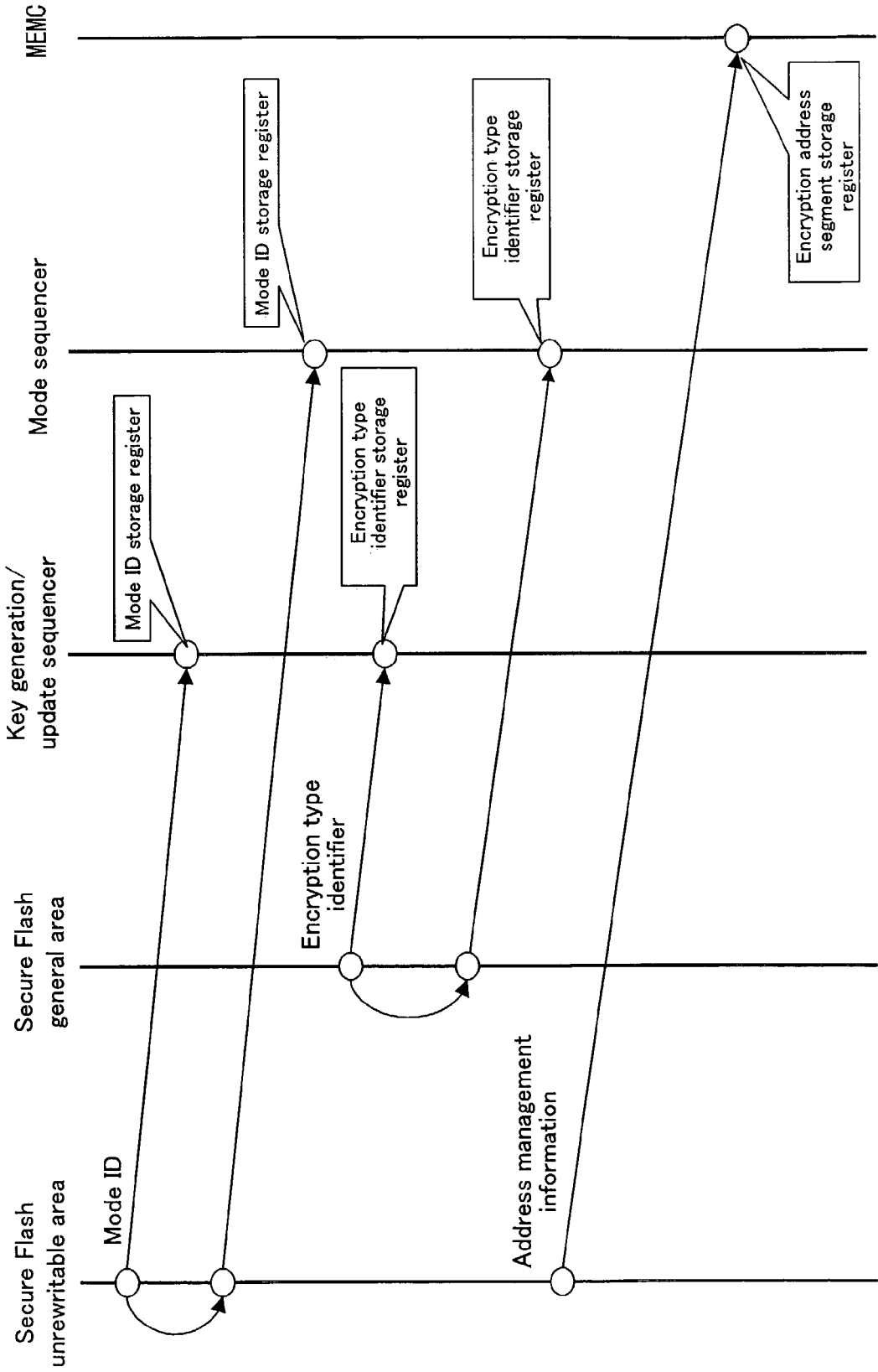
FIG. 4 shows a dataflow of preprocessing SZ2.

Thereafter, preprocessing SZ2 is executed. FIG. 4 illustrates a dataflow of preprocessing SZ2. Herein, the mode ID set in the unrewritable area 11 of the secure memory 10 is set in the mode ID storage register 31 of the key-generation/update sequencer 30 and in the mode ID storage register 41 of the mode sequencer 40. Further, the encryption type identifier set in the general area 13 of the secure memory 10 is set in the encryption type identifier storage register 32 of the key-generation/update sequencer 30 and in the encryption type identifier storage register 42 of the mode sequencer 40. Furthermore, the address management information stored in the unrewritable area 11 of the secure memory 10 is set in a cipher address segment storage register 81 of an MEMC 80. The processes described hereinabove correspond to initial value setting phases PA0, PB0, PC0 and PD0 of FIG. 2.

Thereafter, the operation is performed in a mode determined according to the value of the mode ID (SZ3).

<Administrator Mode>

When the mode ID is "00", the secure LSI device 1 is set to the administrator mode to execute raw (binary) program execution processing SA1 or program encryption processing SA2 depending on the value of the jumper 43 (determined at SA0).

In key-generation program development phase PA1, raw (binary) program execution processing SA1 is executed to generate a key-generation program. The key-generation program is stored in the external memory 100.

Figure 5:
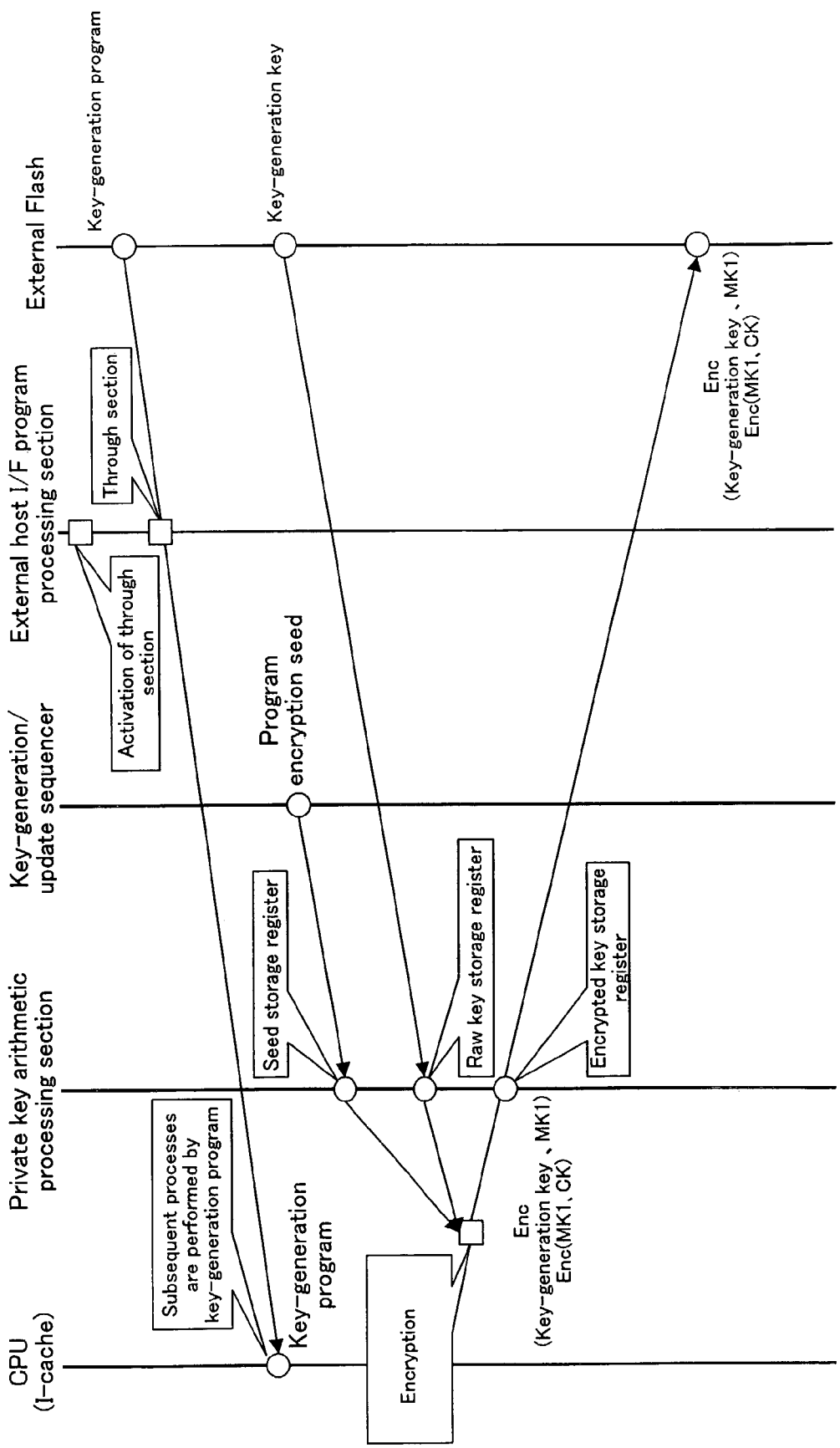
FIG. 5 shows a dataflow of encryption of a key-generation key.

In key-generation program encryption phase PA2, the key-generation program is executed to encrypt any given key-generation key as illustrated in the dataflow of FIG. 5. Specifically, in the external host I/F 50, the through section 52 of the program processing section 51 is activated by the mode sequencer 40. Then, the key-generation program stored in the external memory 100 is supplied to the CPU 65 through the through section 52 and executed by the CPU 65. By executing the key-generation program, a key-generation key stored in the external memory 100 is encrypted by the private key arithmetic processing section 20 using the program encryption seed installed in the key-generation/update sequencer 30.

In the present embodiment, encryption of a key is performed using a first intermediate key and a second intermediate key. Specifically, as a result of the encryption, an encrypted key (herein, Enc (key-generation key, MK1)) is obtained by encrypting a raw (binary) key (herein, key-generation key) using the first intermediate key (herein, MK1), and an encrypted first intermediate key (herein, Enc (MK1, CK)) is obtained by encrypting the first intermediate key using the second intermediate key (herein, CK). As a matter of course, the present invention is not limited to such a key encryption method.

Figure 6:
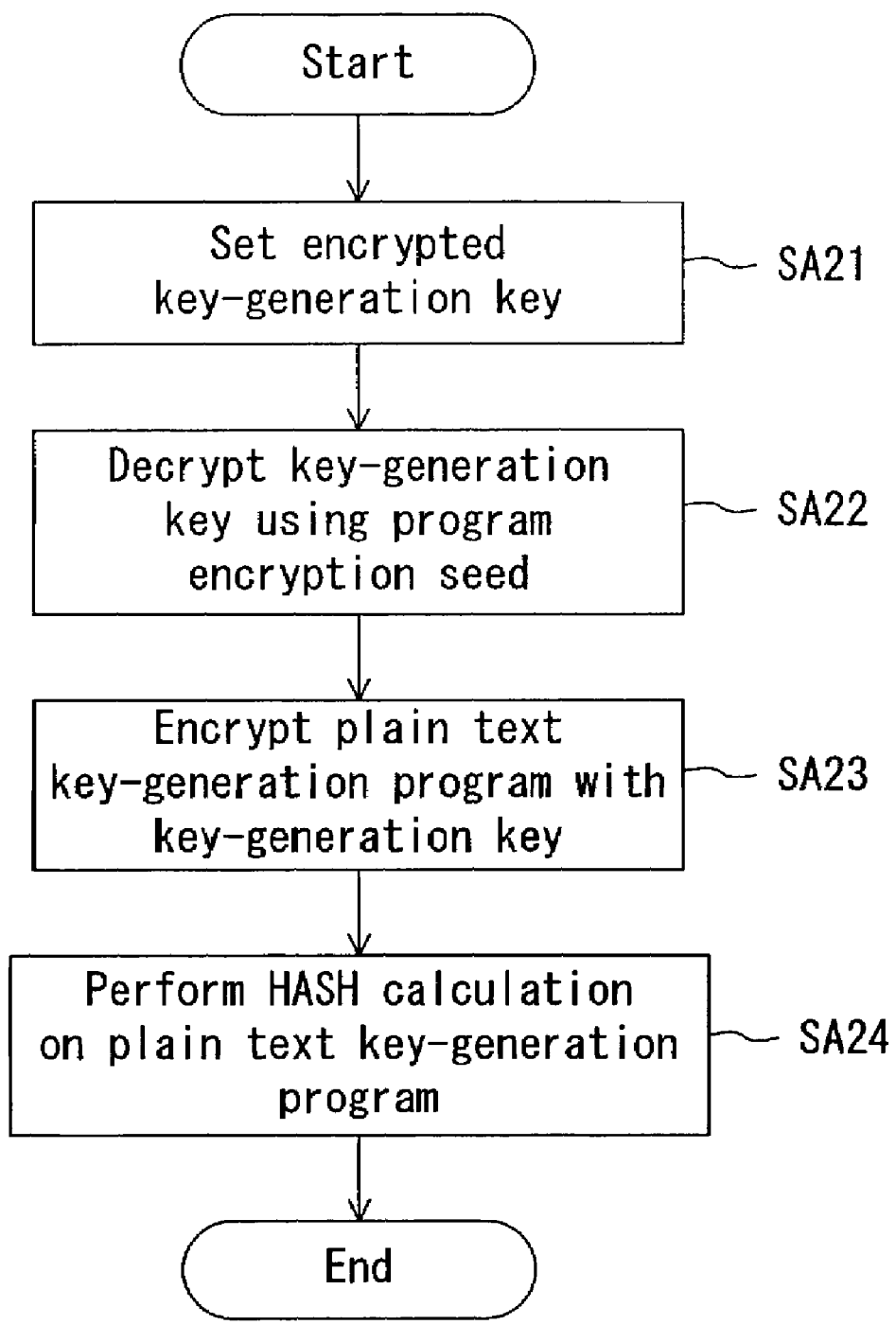
FIG. 6 is a flowchart of program encryption processing SA2.
Figure 7:
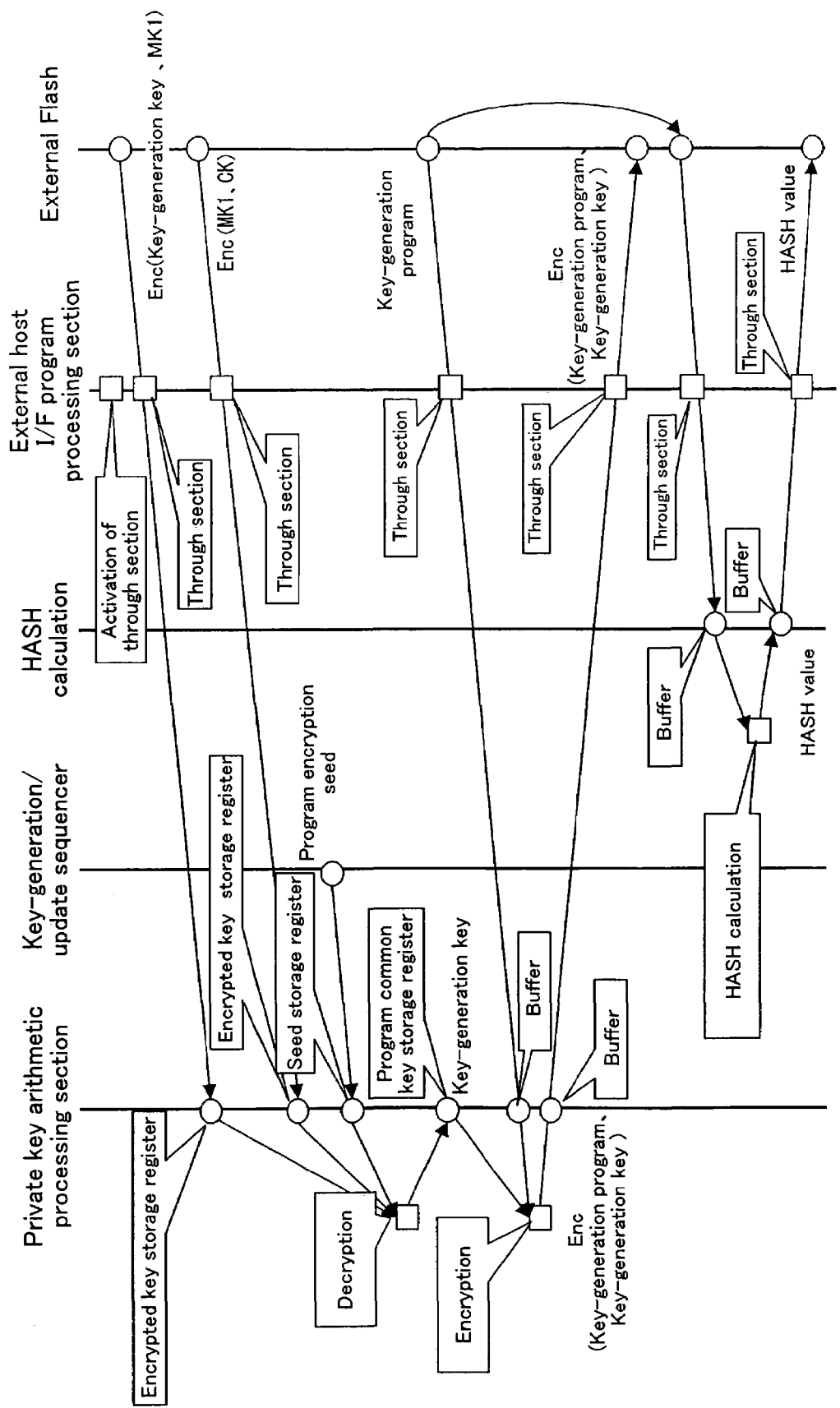
FIG. 7 shows a dataflow of program encryption processing SA2.

Thereafter, program encryption processing SA2 is executed. FIG. 6 is a flowchart of program encryption processing SA2. FIG. 7 illustrates a dataflow of program encryption processing SA2. In the first place, the encrypted key-generation key Enc (key-generation key, MK1), Fnc (MK1, CK), which has been stored in the external memory 100, is set in the private key arithmetic processing section 20 through the through section 52 of the external host I/F 50 (SA21). The encrypted key-generation key is decrypted using the program encryption seed installed in the key-generation/update sequencer 30 to obtain a key-generation key (SA22). Then, a raw (binary) key-generation program stored in the external memory 100 is read into the secure LSI device 1 and encrypted using the key-generation key decrypted at SA22, and the encrypted key-generation program is written in the external memory 100 (SA23). Furthermore, the raw (binary) key-generation program of the external memory 100 is HASH-calculated by the HASH calculation section 70, and the calculated HASH value is written in the external memory 100 (SA24).

In the administrator mode, according to the operation described above, an encrypted key-generation program which is encrypted using a key-generation key, i.e., Enc (key-generation program, key-generation key), the encrypted key-generation key Enc (key-generation key, MK1), Enc (MK1, CK), and the HASH value of the key-generation program are generated.

<Key-Generation Mode>

When the mode ID is "01", the secure LSI device 1 is set to the key-generation mode to execute key generator production processing SB1 or key management/issuance processing SB2 depending on the value of the installation mode flag (determined at SB0).

Figure 8:
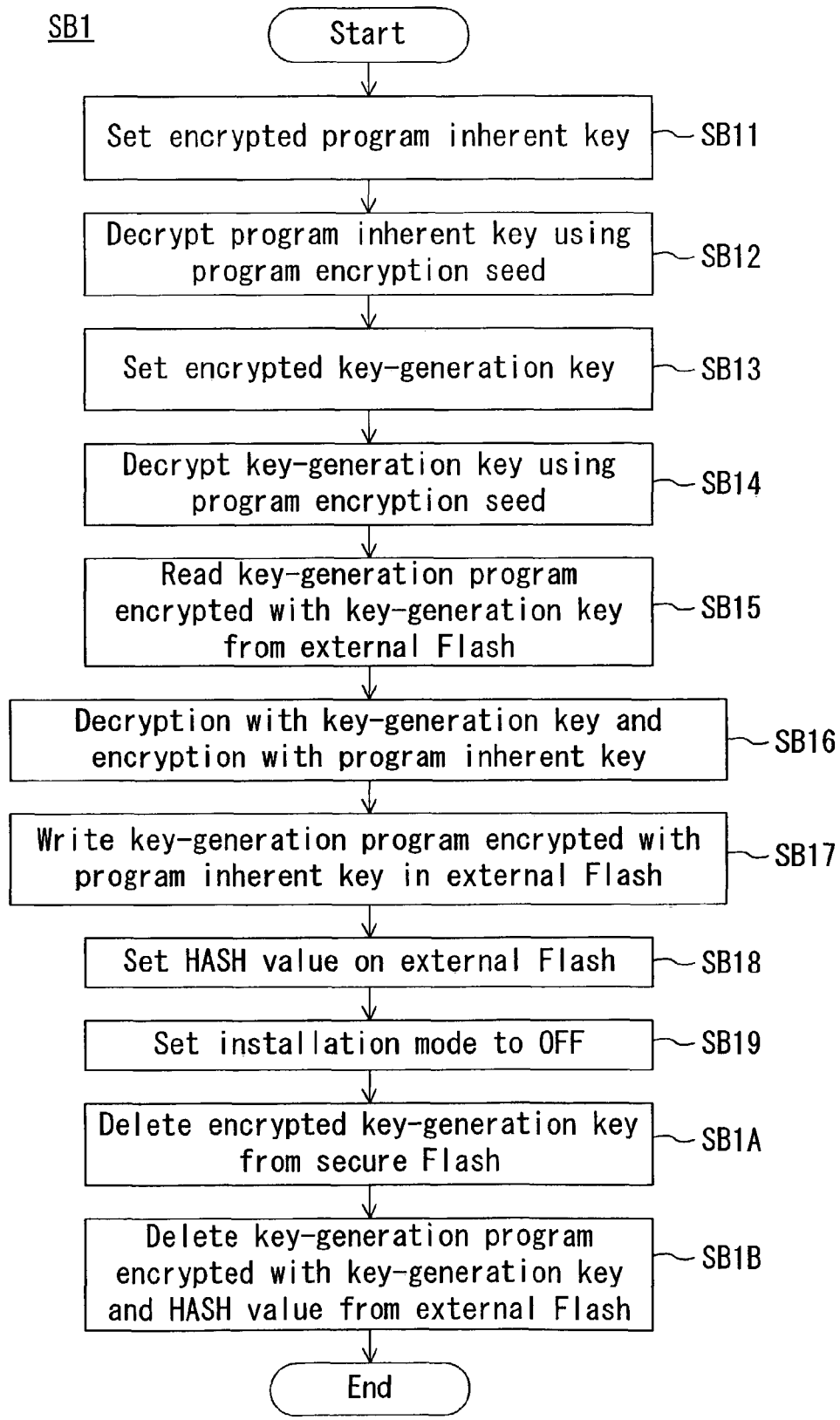
FIG. 8 is a flowchart of key generator production processing SB1 in the key-generation mode.
Figure 9:
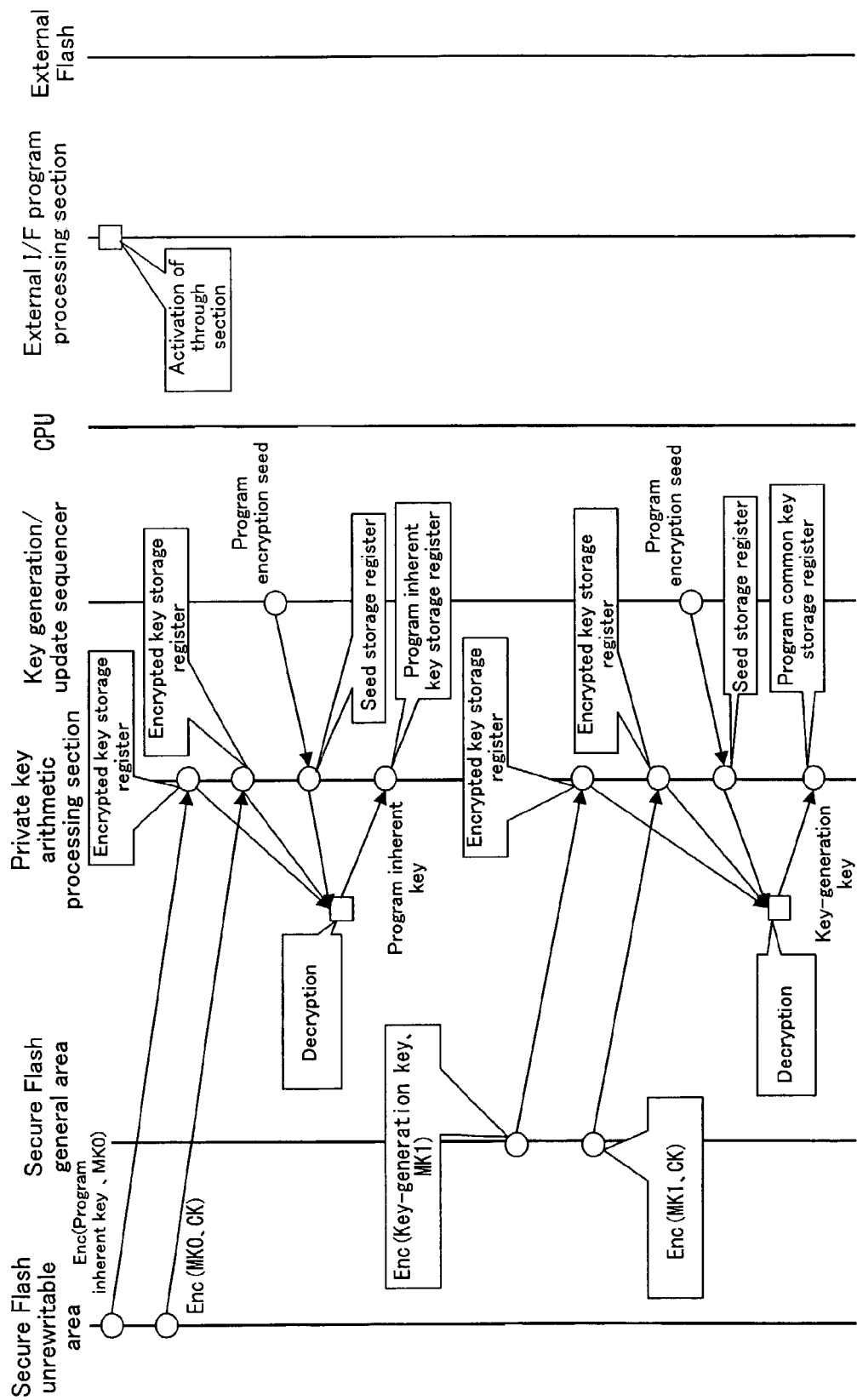
FIGS. 9 and 10 show a dataflow of key generator production processing SB1.
Figure 10:
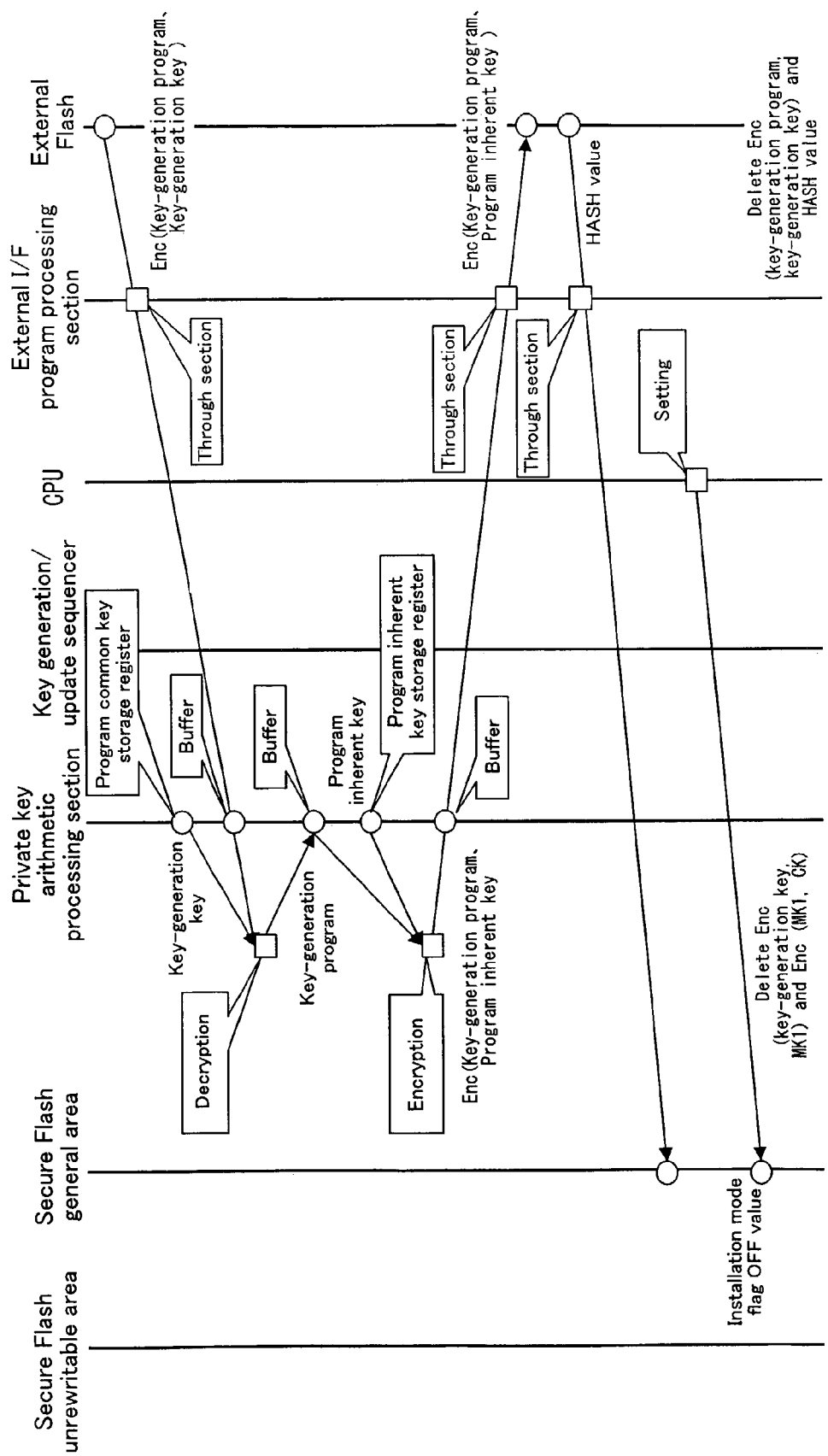

In key generator production phase PB1, key generator production processing SB1 is executed. FIG. 8 is a flowchart of processing SB1. FIGS. 9 and 10 illustrate a dataflow of processing SB1. The through section 52 of the program processing section 51 included in the external host I/F 50 is activated depending on the mode ID and the value of the installation mode flag.

In the first place, the encrypted program inherent key Enc (program inherent key, MK0), Enc (M0, CK), which has been stored in the unrewritable area 11, is set in an encrypted key storage register of the private key arithmetic processing section 20 (SB11). The encrypted program inherent key is decrypted using the program encryption seed installed in the key-generation/update sequencer 30 to obtain a program inherent key (SB12). Then, the encrypted key-generation key Enc (key-generation key, MK1), Enc (MK1, CK), which has been set in initial value setting phase PB0, is set in the encrypted key storage register of the private key arithmetic processing section 20 (SB13). The encrypted key-generation key is decrypted using the program encryption seed installed in the key-generation/update sequencer 30 to obtain a program inherent key (SB14).

Thereafter, the encrypted key-generation program Enc (key-generation program, key-generation key), which has been encrypted using the key-generation key and stored in the external memory 100, is taken into the private key arithmetic processing section 20 through the through section 52 of the program processing section 51 included in the external host I/F 50 (SB15). The encrypted key-generation program read into the private key arithmetic processing section 20 is decrypted using the key-generation key and then encrypted using the program inherent key, thereby obtaining an encrypted key-generation program Enc (key-generation program, program inherent key) (SB16). The encrypted key-generation program Enc (key-generation program, program inherent key) is written in the external memory 100 (SB17). Then, the HASH value stored in the external memory 100 is set in the general area 13 of the secure memory 10 through the through section 52 (SB18).

Then, the value of the installation mode flag stored in the general area 13 of the secure memory 10 is set to "OFF" by the CPU 65 (SB19). Then, the encrypted key-generation key Enc (key-generation key, MK1), Enc (MK1, CK), which has been stored in the general area 13 of the secure memory 10, is deleted (SB1A). On the other hand, the encrypted key-generation program Enc (key-generation program, key-generation key) and the HASH value, which have been stored in the external memory 100, are deleted (SB1B).

Figure 11:
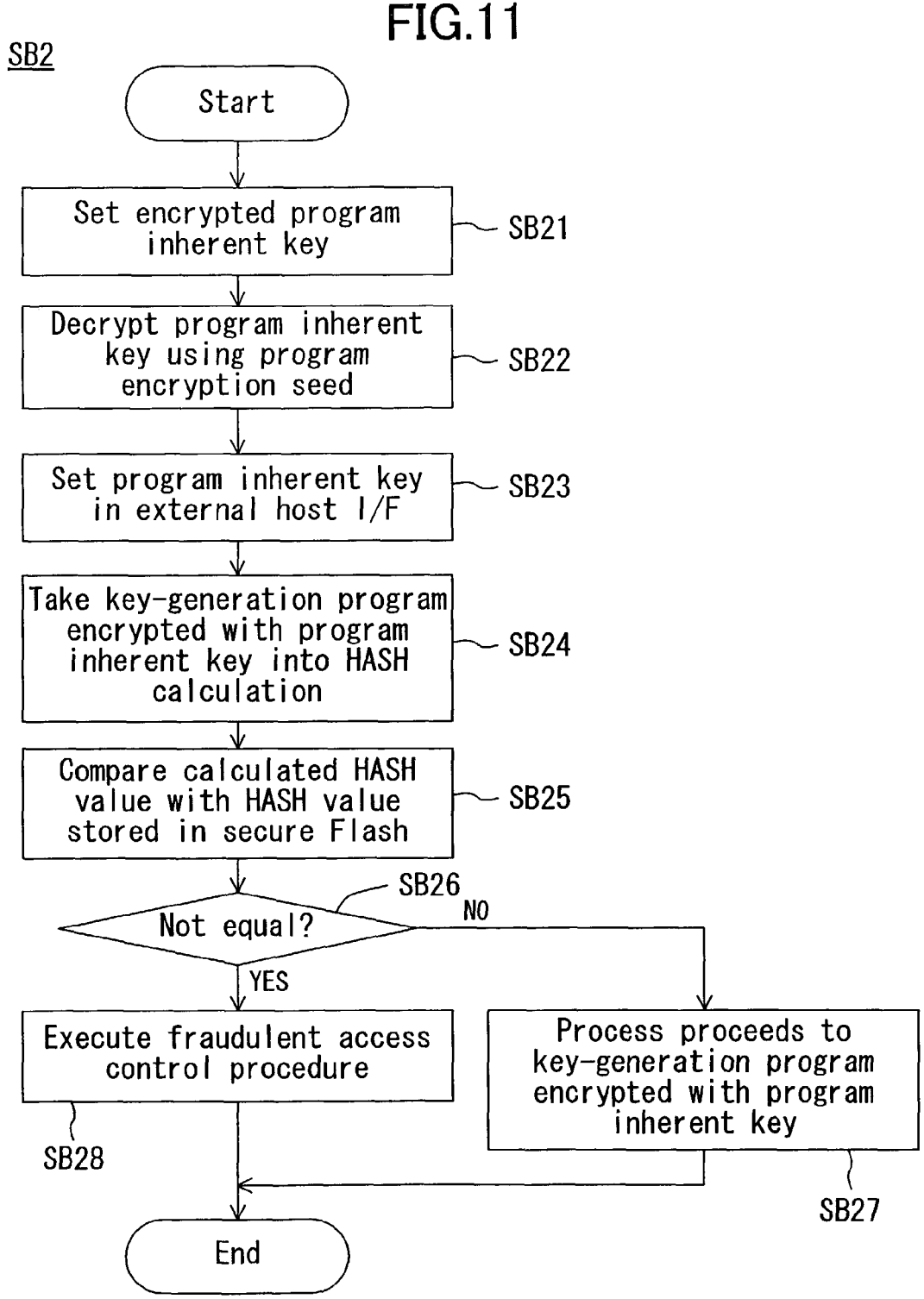
FIG. 11 is a flowchart of key management/issuance processing SB2 in the key-generation mode.
Figure 12:
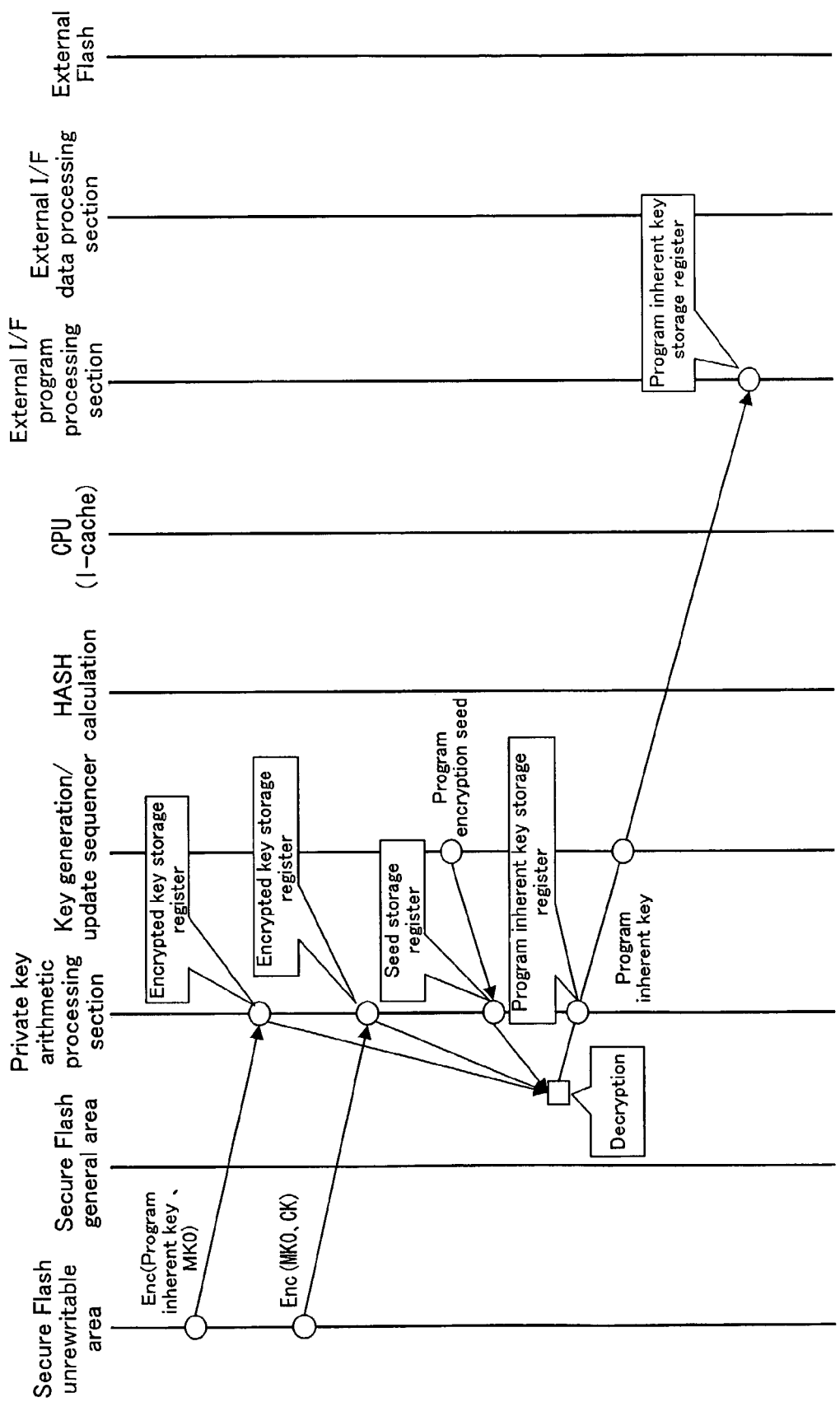
FIGS. 12 and 13 show a dataflow of key management/issuance processing SB2.
Figure 13:
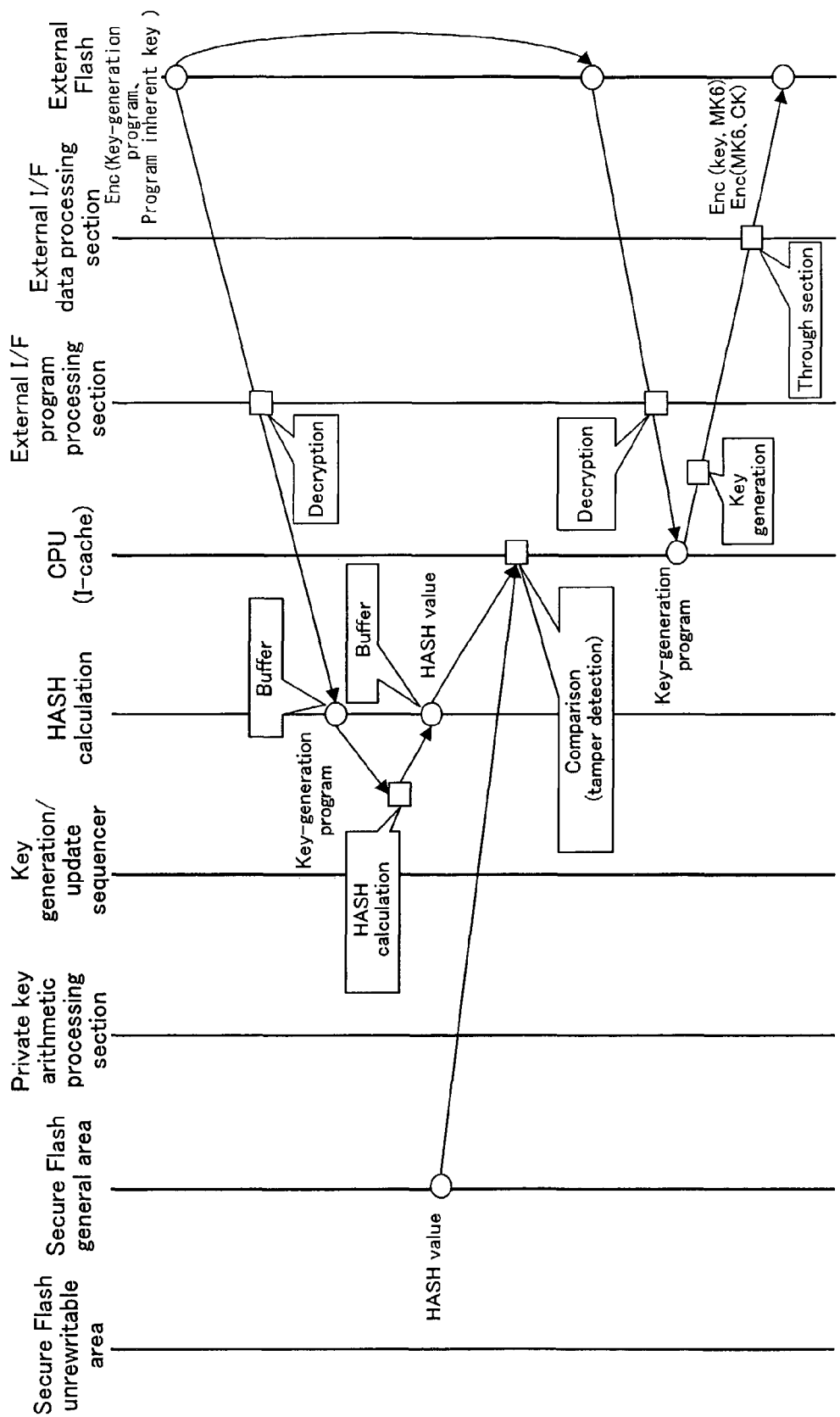

In key management/issuance phase PB2, key management/issuance processing SB2 is executed. FIG. 11 is a flowchart of processing SB2. FIGS. 12 and 13 illustrate a dataflow of processing SB2. The encryption engine 54 for program decryption which is included in the external host I/F 50 is activated depending on the mode ID and the value of the installation mode flag.

In the first place, the encrypted program inherent key Enc (program inherent key, MK0), Enc (MK0, CK), which has been stored in the unrewritable area 11 of the secure memory 10, is set in an encrypted key storage register of the private key arithmetic processing section 20 (SB21). The encrypted program inherent key is decrypted using the program encryption seed installed in the key-generation/update sequencer 30 to obtain a program inherent key (SB22). Then, the obtained program inherent key is set in a program inherent key storage register of the encryption engine 54 for program decryption which is included in the external host I/F 50 (SB23).

Thereafter, the encrypted key-generation program Enc (key-generation program, program inherent key), which has been encrypted using the program inherent key and stored in the external memory 100, is decrypted through the encryption engine 54 for program decryption which is included in the program processing section 51 of the external host I/F 50. The decrypted key-generation program is taken into the HASH calculation section 70 to calculate the HASH value (SB24). The calculated HASH value is compared with the HASH value stored in the general area 13 of the secure memory 10 to check whether or not the key-generation program is tampered (SB25). If the HASH values are equal to each other (No at SB26), the process proceeds to the key-generation program Enc (key-generation program, program inherent key) stored in the external memory 100 to execute generation of a key (SB27). If the HASH values are not equal to each other (Yes at SB26), it is determined that some fraud has been committed, and a fraudulent access control procedure is executed (SB28).

In the key-generation mode, the through section 52 is activated for inputting a program therethrough, or the encryption engine 54 for program decryption is activated to decrypt and input an encrypted program, but nothing else is executed. Thus, the operation of the secure LSI device 1 is restricted such that execution of a raw (binary) program is prohibited.

<Development Mode>

When the mode ID is "10", the secure LSI device 1 is set to the development mode to execute program encryption processing SC1, raw (binary) program execution processing SC2, program installation processing SC3, or encrypted program execution processing SC4 depending on the value of the jumper 43 (determined at SC0).

In application program development phase PC1, the delay section 53 is activated to execute raw (binary) program execution processing SC2, whereby an application program is developed. The developed application program is stored in the external memory 100.

Figure 14:
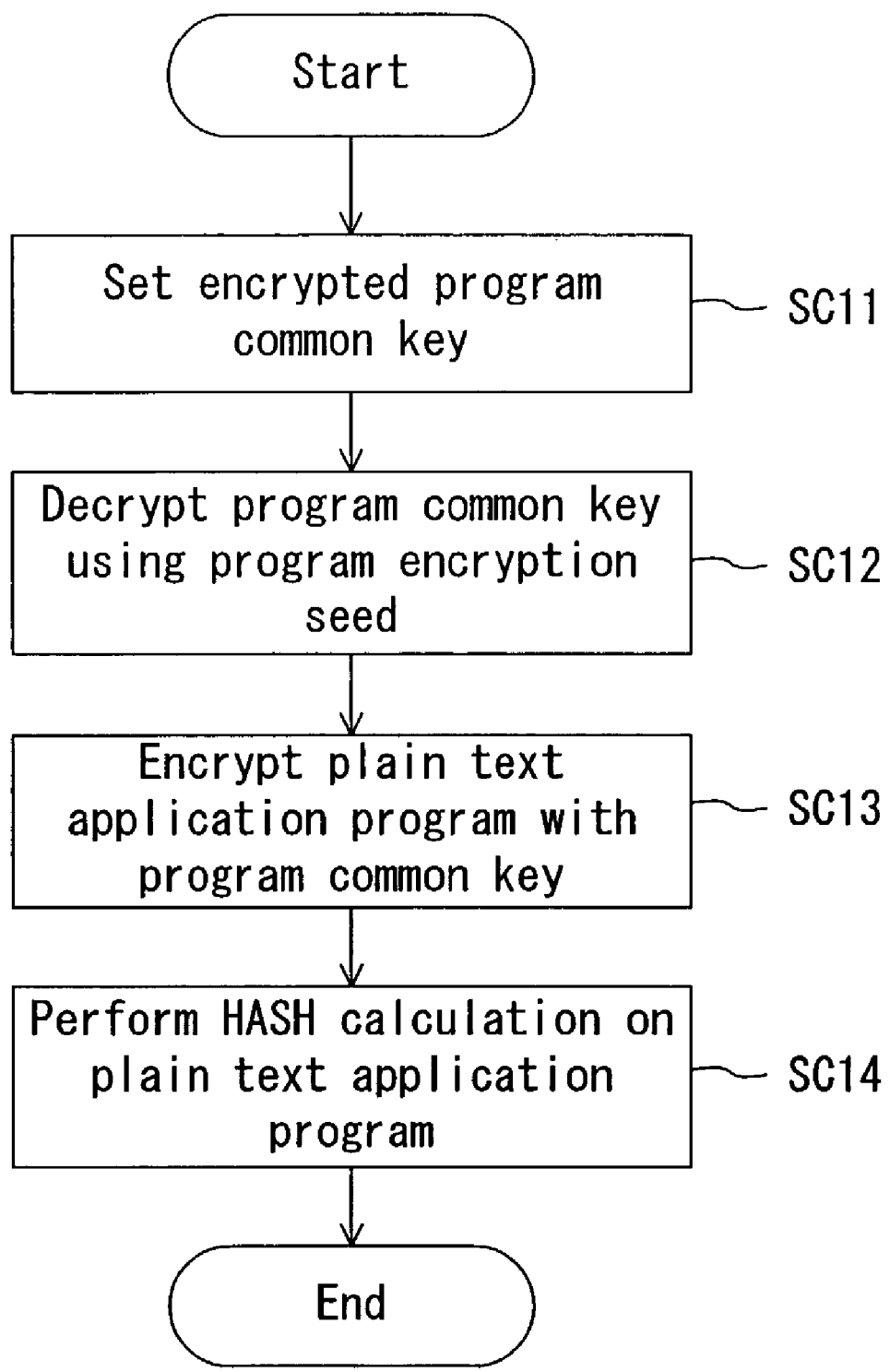
FIG. 14 is a flowchart of program encryption processing SC1 in the development mode.
Figure 15:
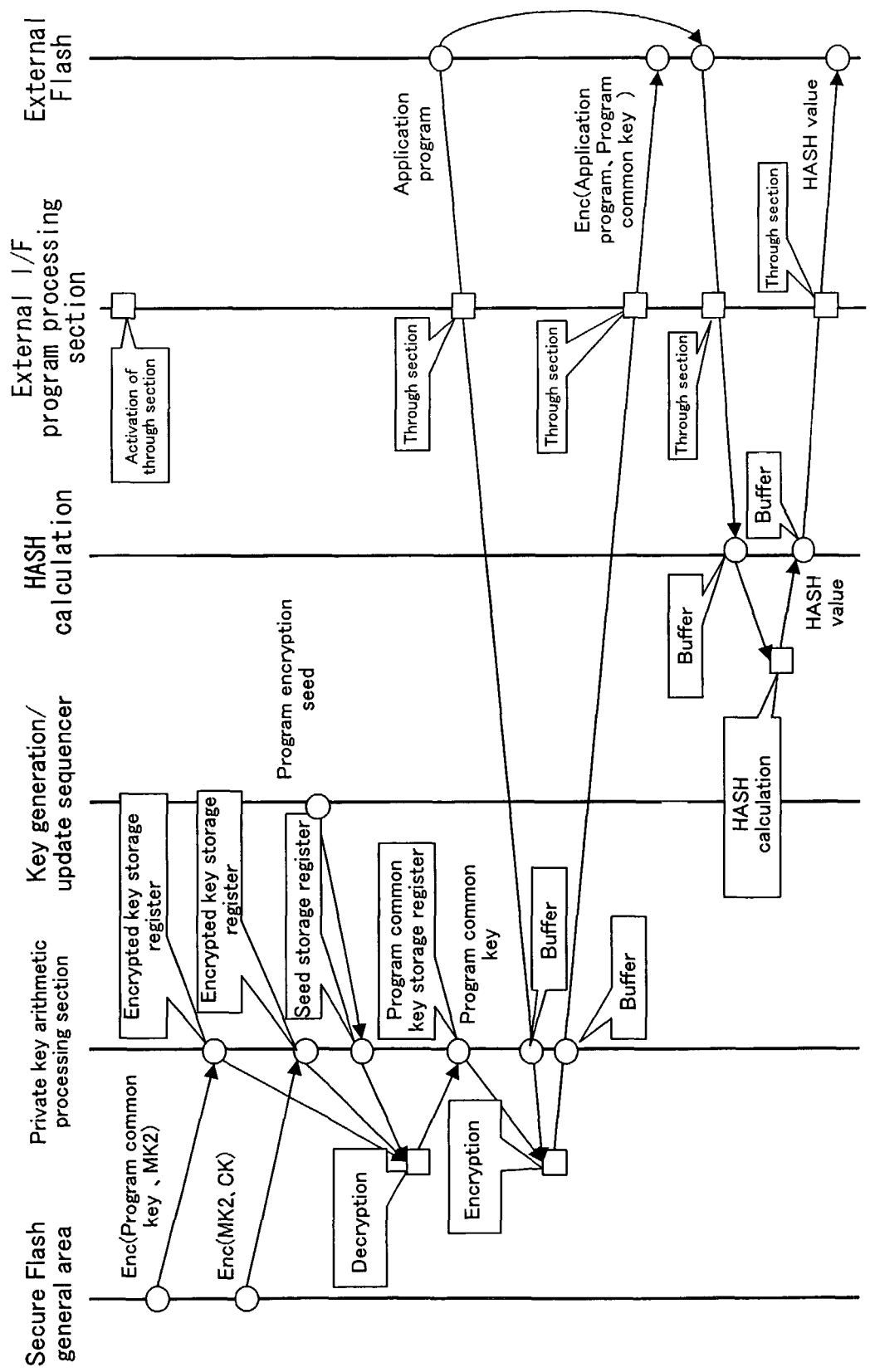
FIG. 15 shows a dataflow of program encryption processing SC1.

In application program encryption phase PC2, program encryption processing SC1 is executed. FIG. 14 is a flowchart of program encryption processing SC1. FIG. 15 illustrates a dataflow of processing SC1. In the first place, common key information, i.e., the encrypted program common key Enc (program common key, MK2), Enc (MK2, CK), which has been stored in the general areas 14 of the secure memory 10, is set in the private key arithmetic processing section 20 (SC11). The encrypted program common key is decrypted using the program encryption seed installed in the key-generation/update sequencer 30 to obtain a program common key (SC12). Then, a raw (binary) application program stored in the external memory 100 is read into the secure LSI device 1 and encrypted using the program common key decrypted at SC12, and the encrypted application program is written in the external memory 100 (SC13). Furthermore, the raw (binary) application program of the external memory 100 is HASH-calculated by the HASH calculation section 70, and the calculated HASH value is written in the external memory 100 (SC14).

As a result of the operation described above, the encrypted application program which is encrypted using the program common key, i.e., Enc (application program, program common key), and the HASH value of the application program are generated.

In application program installation phase PC3, program installation processing SC3 is executed. In application program debug phase PC4, encrypted program execution processing SC4 is executed. These processing are the same as processing SD1 and SD2 in the product operation mode, respectively, and therefore, details thereof will be described later.

As described above, an LSI device 1, which has a secure memory 10 including an unrewritable area 11 and which possesses high confidentiality, is employed as an environment for developing a program by changing the operation mode of the LSI device 1 from the installation mode to the development mode, whereby the security of the program development environment is improved as compared with conventional techniques.

Furthermore, an encrypted common key (common key information) stored in the secure memory 10 is decrypted into a raw common key, and encryption of a raw (binary) program is performed using the raw common key. Thus, encryption of a raw (binary) program can be executed while keeping the raw common key secret from a program developer.

Further still, decryption into a raw common key and encryption of a raw (binary) program with the raw common key are executed not by an external instruction but by a boot program. Thus, encryption of the raw (binary) program can be executed while surely keeping the raw common key secret from a program developer.

<Product Operation Mode>

When the mode ID is "11", the secure LSI device 1 is set to the product operation mode to execute program installation processing SD1 or normal boot processing SD2 depending on the value of the installation mode flag (determined at SD0).

Figure 16:
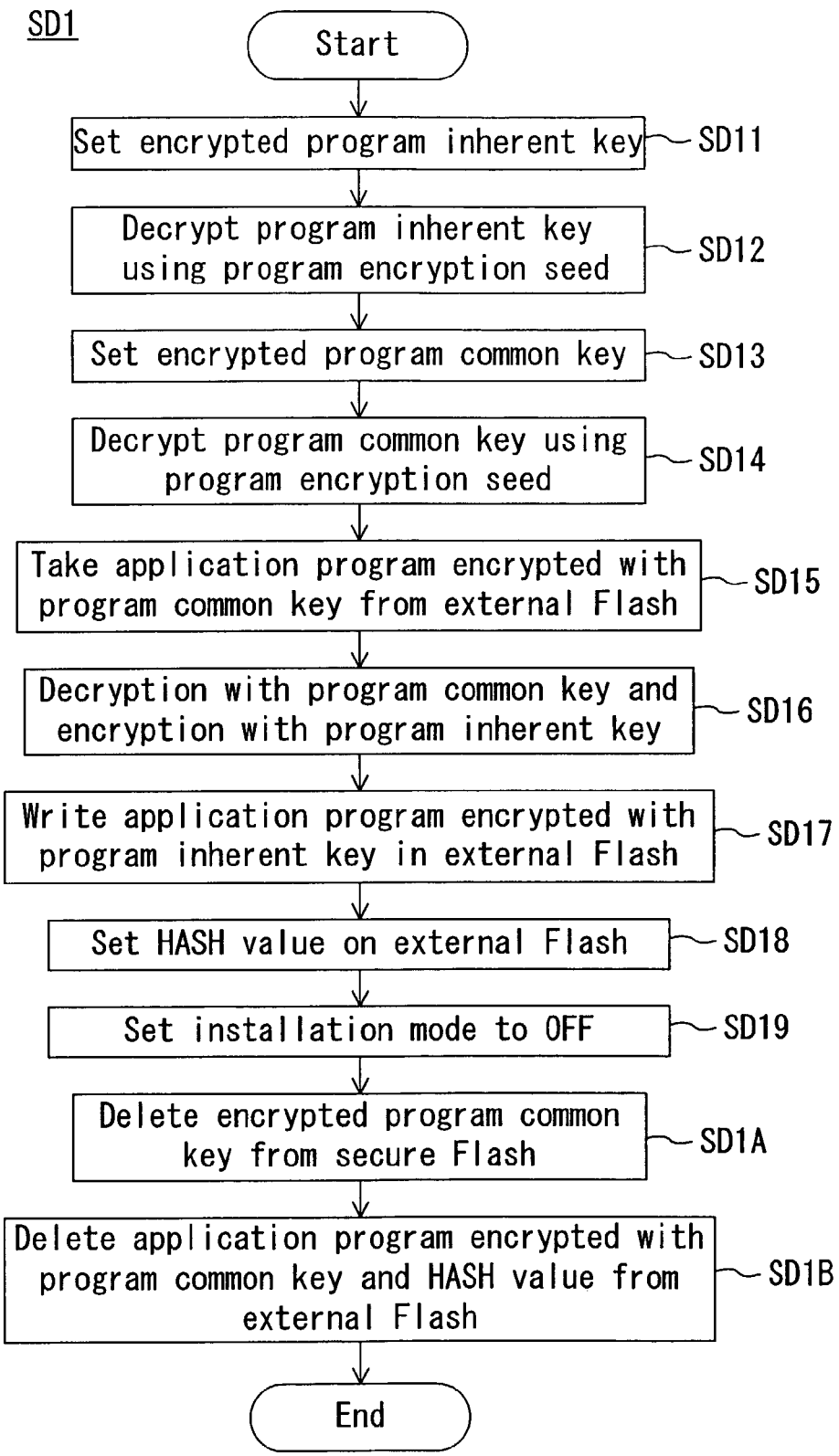
FIG. 16 is a flowchart of program installation processing SD1 in the product operation mode.
Figure 17:
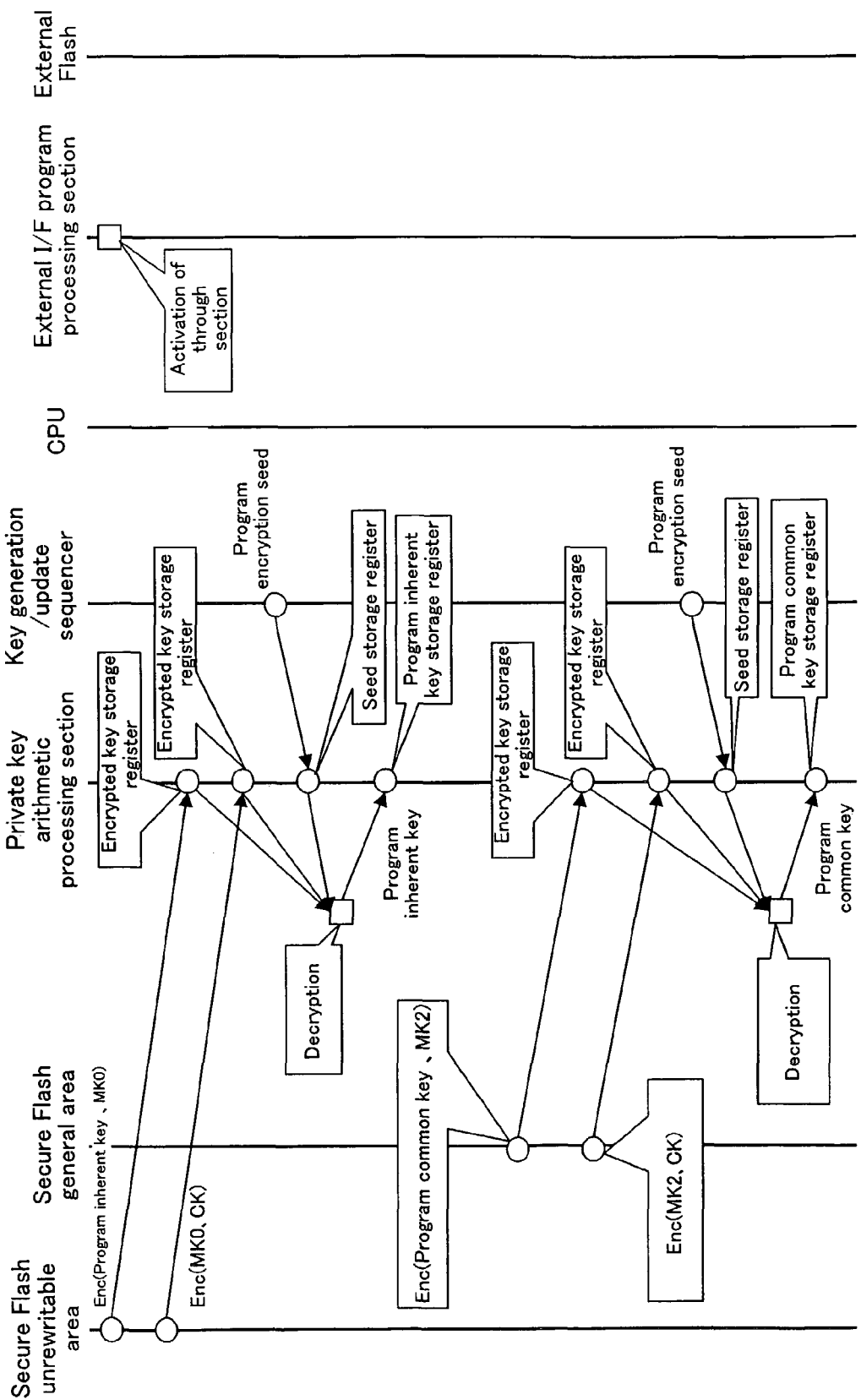
FIGS. 17 and 18 show a dataflow of program installation processing SD1.
Figure 18:
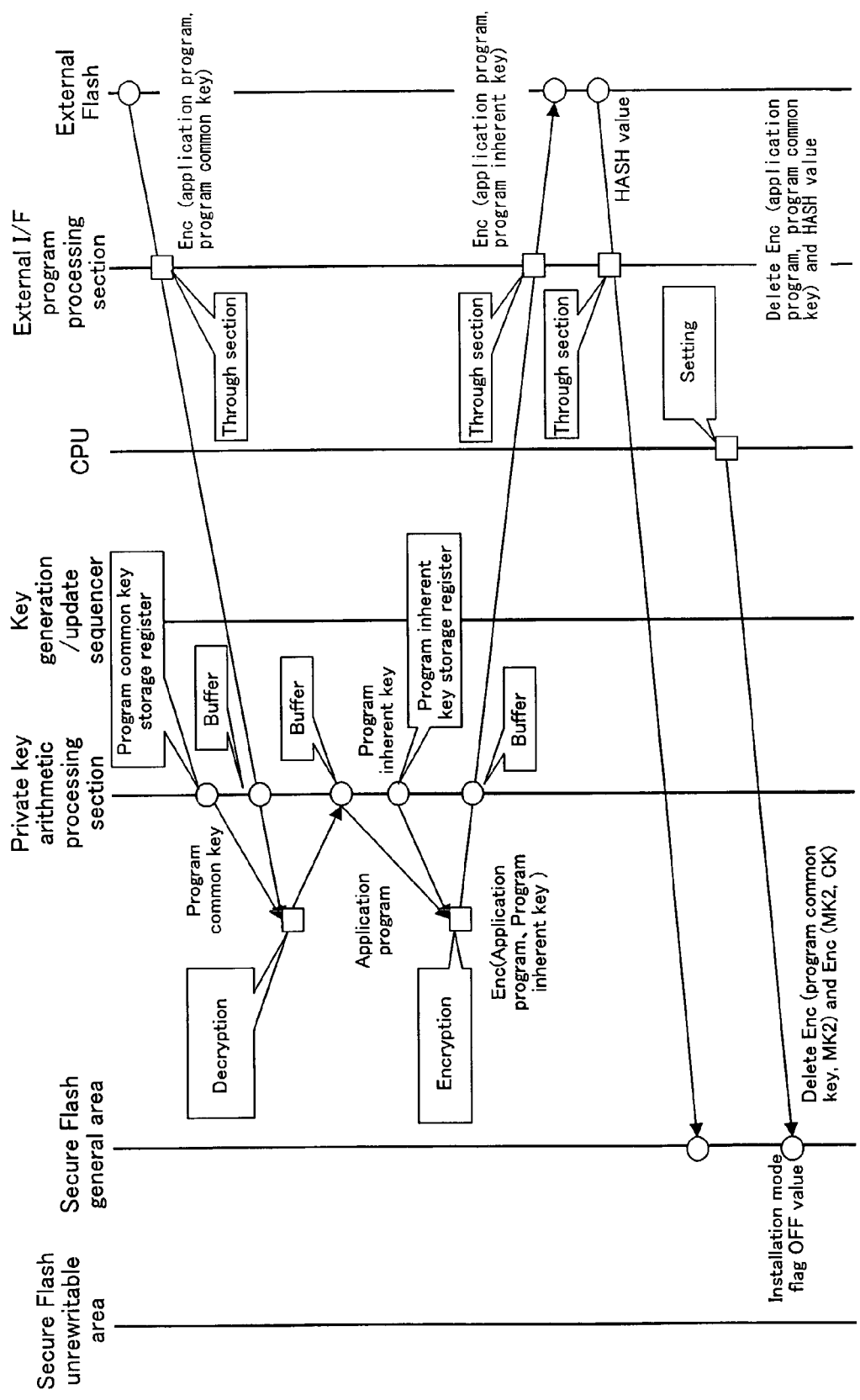

In product installation phase PD1, program installation processing SD1 is executed. FIG. 16 is a flowchart of processing SD1. FIGS. 17 and 18 illustrate a dataflow of processing SD1. The through section 52 of the program processing section 51 included in the external host I/F 50 is activated depending on the mode ID and the value of the installation mode flag.

In the first place, inherent key information, i.e., the encrypted program inherent key Enc (program inherent key, MK0), Enc (MK0, CK), which has been stored in the unrewritable area 11 of the secure memory 10, is set in the encrypted key storage register of the private key arithmetic processing section 20 (SD11). The encrypted program inherent key is decrypted using the program encryption seed installed in the key-generation/update sequencer 30 to obtain a program inherent key (SD12). Then, common key information, i.e., the encrypted program common key Enc (program common key, MK2), Enc (MK2, CK), which has been set in initial value setting phase PD0, is set in the encrypted key storage register of the private key arithmetic processing section 20 (SD11). The encrypted program common key is decrypted using the program encryption seed installed in the key-generation/update sequencer 30 to obtain a program common key (SD14).

Thereafter, the encrypted application program Enc (application program, program common key), which has been encrypted with the program common key and stored in the external memory 100, is taken into the private key arithmetic processing section 20 through the through section 52 of the program processing section 51 included in the external host I/F 50 (SD15). After being read into the private key arithmetic processing section 20, the encrypted application program is decrypted with the program common key and then encrypted with the program inherent key to obtain an encrypted application program Enc (application program, program inherent key) (SD16). The encrypted application program Enc (application program, program inherent key) is written in the external memory 100 (SD17). Then, the HASH value stored in the external memory 100 is set in the general area 13 of the secure memory 10 through the through section 52 (SD18).

Then, the value of the installation mode flag stored in the general area 13 of the secure memory 10 is set to "OFF" by the CPU 65 (SD19). Then, the encrypted program common key Enc (program common key, MK1), Enc (MK1, CK), which has been stored in the general area 13 of the secure memory 10, is deleted (SD1A). On the other hand, the encrypted application program Enc (application program, program common key) and the HASH value, which have been stored in the external memory 100, are deleted (SD1B).

That is, before being installed in a system, the common key-encrypted program is converted to an inherent key-encrypted program by switching the key for encryption from the common key to the inherent key. As a result, programs installed in different products of users are programs encrypted with different inherent keys, and thus, the confidentiality of the programs is improved. Furthermore, even if a cipher (encryption) is broken, the number of products to be damaged is restricted, and therefore, the security level is improved as compared with conventional techniques.

The inherent key may be generated based on an inherent ID. Specifically, for example, a unique inherent ID is installed as inherent key information in the secure memory 10 of each secure LSI device 1. In product installation phase PD1, an inherent key may be generated from the installed inherent ID by a boot program.

Figure 19:
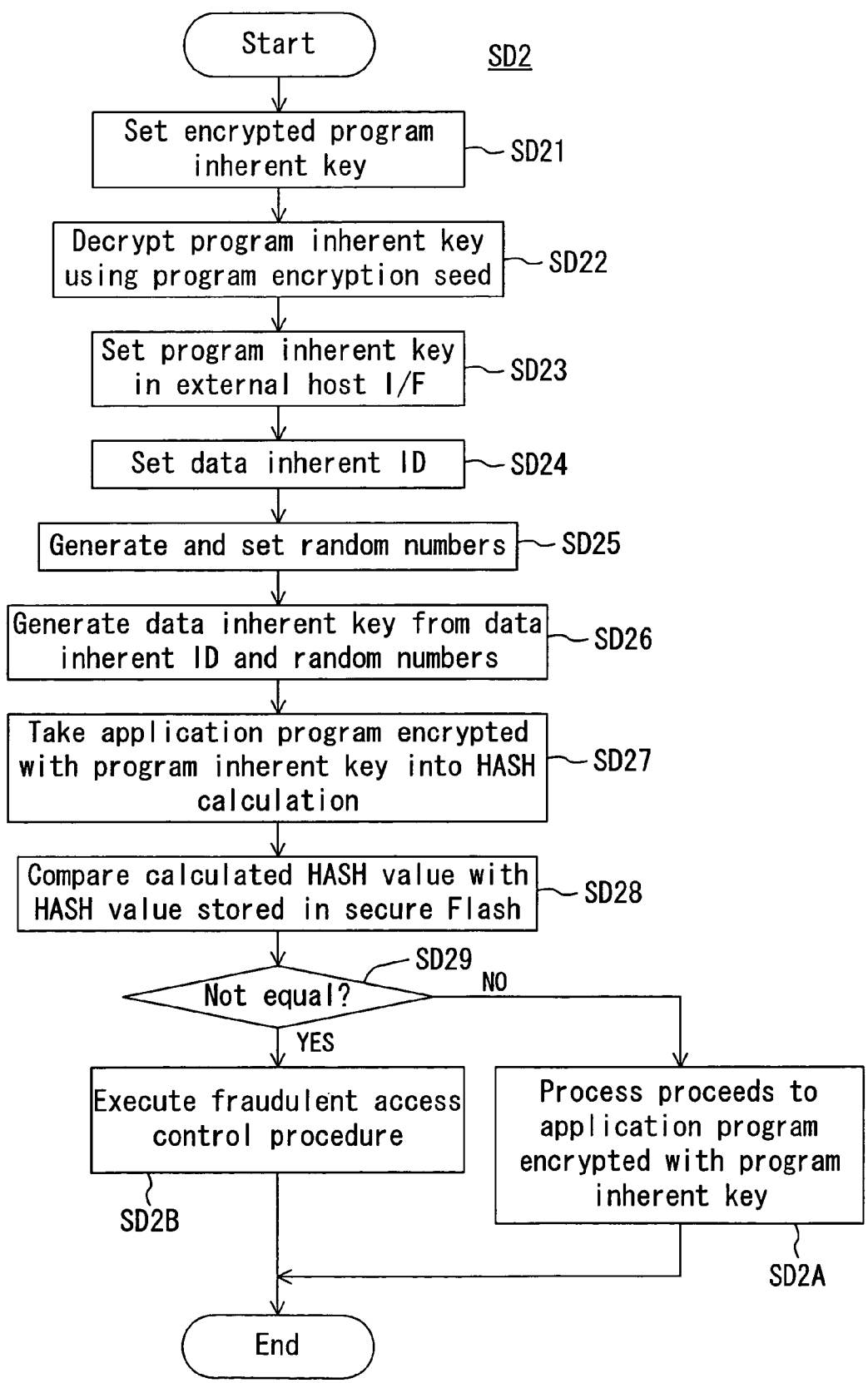
FIG. 19 is a flowchart of normal boot processing SD2 in the product operation mode.
Figure 20:
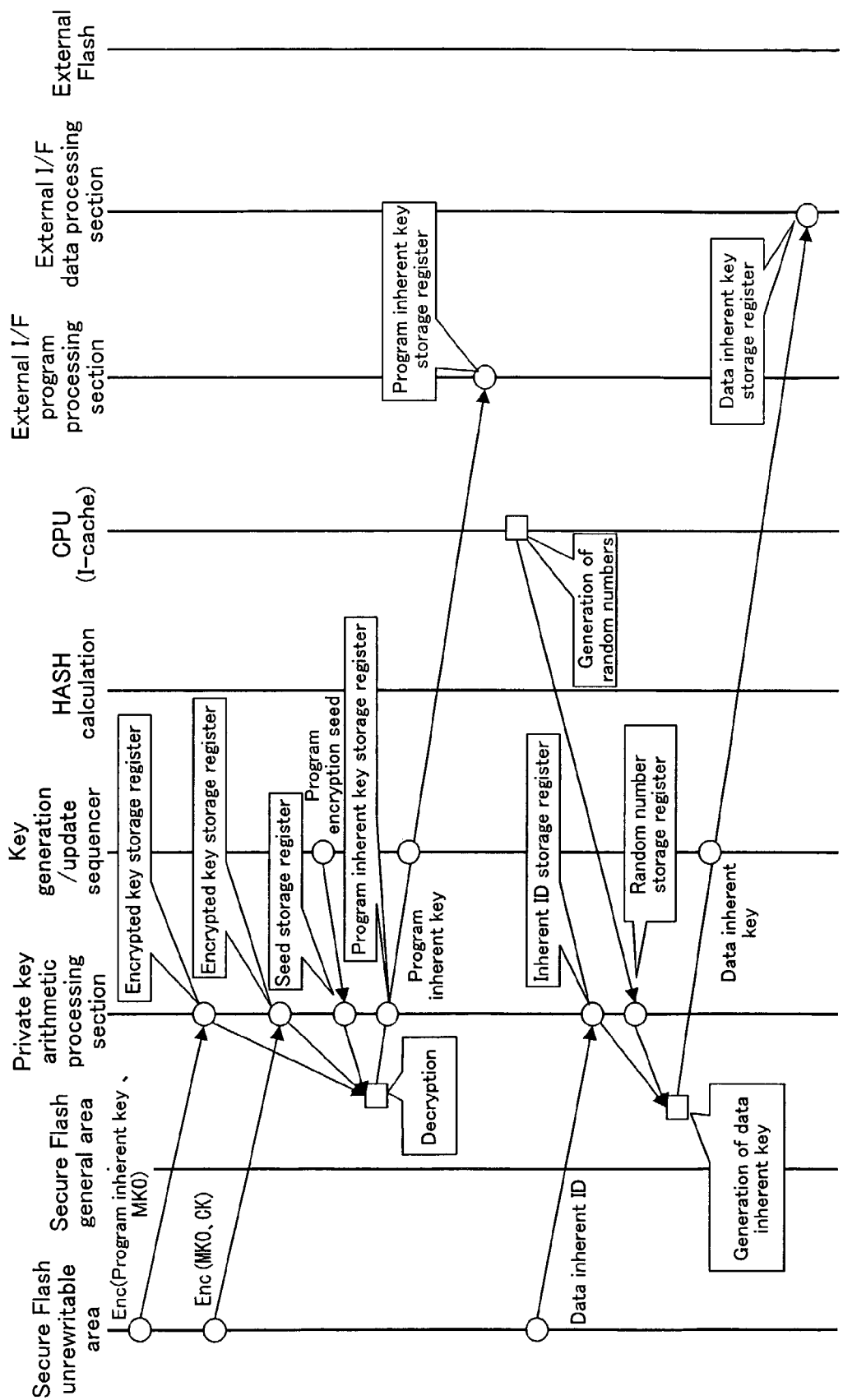
FIGS. 20 and 21 show a dataflow of normal boot processing SD2.
Figure 21:
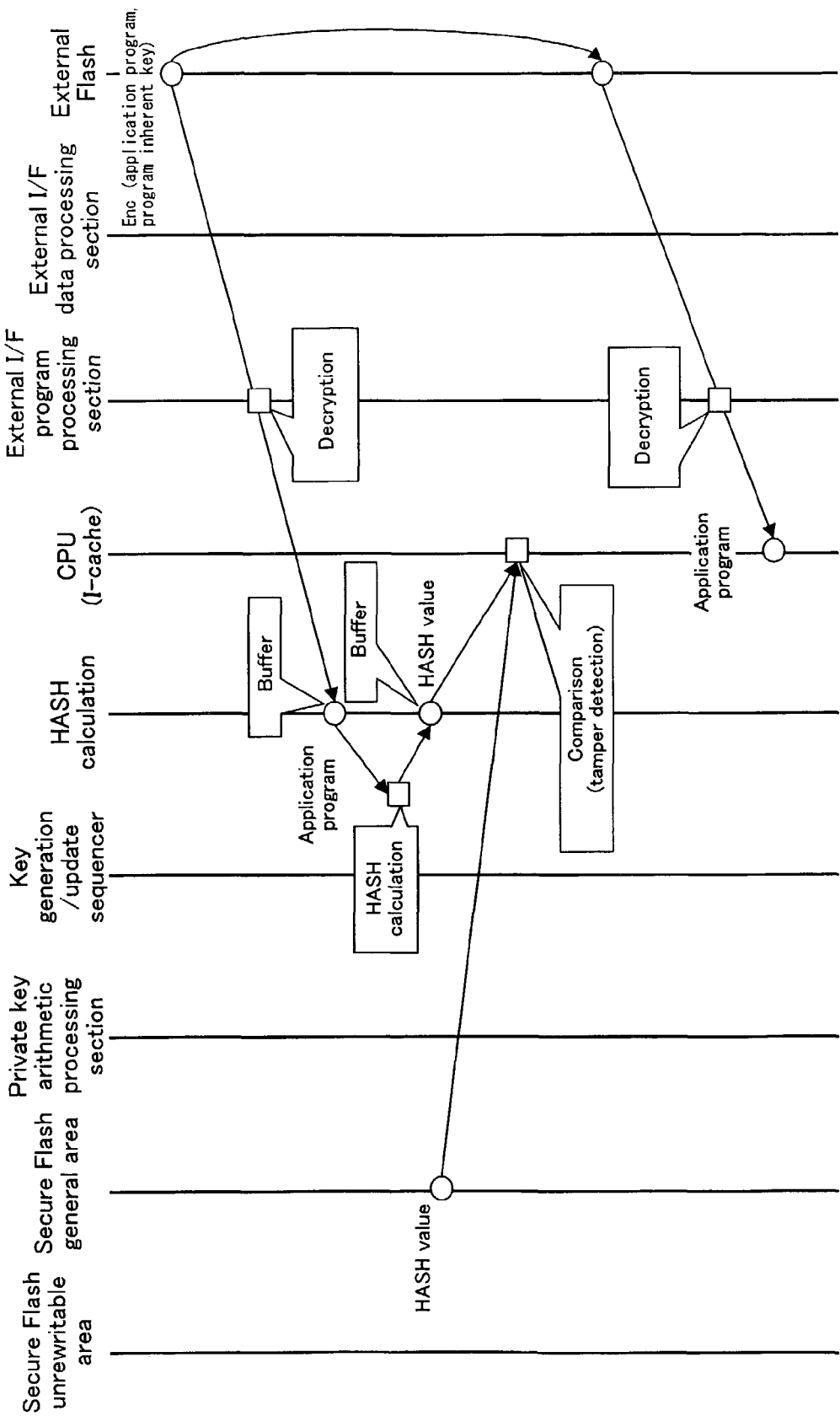

In product operation phase PD2, normal boot processing SD2 is executed. FIG. 19 is a flowchart of processing SD2. FIGS. 20 and 21 illustrate a dataflow of processing SD2. The encryption engine 54 for program decryption which is included in the external host I/F 50 is activated depending on the mode ID and the value of the installation mode flag.

In the first place, the encrypted program inherent key Enc (program inherent key, MK0), Enc (MK0, CK), which has been stored in the unrewritable area 11 of the secure memory 10, is set in the encrypted key storage register of the private key arithmetic processing section 20 (SD21). The encrypted program inherent key is decrypted using the program encryption seed installed in the key-generation/update sequencer 30 to obtain a program inherent key (SD22). The obtained program inherent key is set in the program inherent key storage register of the encryption engine 54 for program decryption which is included in the external host I/F 50 (SD23).

Thereafter, a data inherent ID stored in the unrewritable area 11 of the secure memory 10 is set in the inherent ID storage register of the private key arithmetic processing section 20 (SD24). Then, random numbers are generated by the CPU 65 and set in a random number storage register (SD25). The private key arithmetic processing section 20 generates a data inherent key from the data inherent ID and the random numbers (SD26).

Thereafter, the encrypted application program Enc (application program, program inherent key), which has been encrypted with the program inherent key and stored in the external memory 100, is decrypted through the encryption engine 54 for program decryption which is included in the program processing section 51 of the external host I/F 50. The decrypted application program is transferred to the HASH calculation section 70, and the HASH value thereof is calculated (SD27). The calculated HASH value is compared with the HASH value stored in the general area 13 of the secure memory 10 to check whether or not the application program is tampered (SD28). If the HASH values are equal to each other (No at SD29), the process proceeds to the application program Enc (application program, program inherent key) stored in the external memory 100 to execute its application (SD2A). If the HASH values are not equal to each other (Yes at SD29), it is determined that some fraud has been committed, and a fraudulent access control procedure is executed (SD2B).

In the product operation mode, the through section 52 is activated for inputting a program therethrough, or the encryption engine 54 for program decryption is activated to decrypt and input an encrypted program, but nothing else is executed. Thus, the operation of the secure LSI device 1 is restricted such that execution of a raw (binary) program is prohibited.

In the development mode and the product operation mode, if it is attempted to externally execute a process of generating a key using the private key arithmetic processing section 20, such an attempt from the outside is discriminated and prohibited by the key-generation/update sequencer 30. That is, in the development mode and the product operation mode, the key-generation/update sequencer 30 restricts the operation of the secure LSI device 1 such that the program encryption seed cannot be used except at the time of boot-up of the secure LSI device 1. Thus, a process of generating a key cannot be executed.

According to the present embodiment, programs and data are stored in the external memory 100 while initial values to be set in the secure memory 10 are stored in the external tool 110. However, according to the present invention, the programs, data and initial values may be stored in any of the external memory 100 and the external tool 110. For example, no problem would occur even if the programs and data are read from the external tool 110 and re-encrypted.

In the present embodiment, each processing is executed by a boot program, but the present invention is not limited thereto. A portion or the entirety of the processing may be executed by some other means. However, it should be noted that the security can be improved by executing the processing not by an external instruction but by the boot program.

As described above, according to the present invention, an LSI device, which has a secure memory including an unrewritable area and which possesses high confidentiality, is employed as an environment for developing a program by changing the operation mode of the LSI device from the installation mode to the development mode, whereby the security of the program development environment is improved as compared with conventional techniques.

What is claimed is:

1. A method for developing a program which is to be installed in a system having an LSI device, the LSI device having a secure memory which includes an unrewritable area, the method comprising the steps of:
- providing another LSI device having the same structure as that of the LSI device;
- setting the provided LSI device to a development mode based on an inherent and permanent key information for the development mode, which is implemented in the unrewritable area of the LSI device in advance, so that the provided LSI device is used as a development LSI device, the development mode being different from a product operation mode employed at the times of program installation and product operation, the inherent and permanent key information for the development mode being different from an inherent and permanent key information for the product operation mode; and
- developing the program on the development LSI device.

2. The method of claim 1, wherein the operation of the provided LSI device is restricted such that when being set to the development mode, the provided LSI device can execute a raw (binary) program, and when being set to the product operation mode, the provided LSI device cannot execute a raw (binary) program with an executable form but can execute an encrypted program.

3. The method of claim 1, further comprising the step of encrypting the program developed on the development LSI device at the program development step.

4. The method of claim 1, wherein the operation of the LSI device is restricted such that when being set to the development mode, the LSI device cannot generate a key for encrypting a raw (binary) program.

5. The method of claim 1, further comprising the steps of:
- providing an LSI device having the same structure as that of the LSI device;
- setting the provided LSI device to a key-generation mode so that the provided LSI device is used as an key-generation LSI device, the key-generation mode being different from the development mode and the product operation mode; and
- installing an encrypted key-generation program in the key-generation LSI device and executing the key-generation program to generate a key.

6. The method of claim 5, wherein the operation of the LSI device is restricted such that when being set to the key-generation mode, the LSI device cannot execute a raw (binary) program.

7. The method of claim 5, further comprising the steps of:
- providing an LSI device having the same structure as that of the LSI device;
- setting the provided LSI device to an administrator mode so that the provided LSI device is used as an administrator LSI device, the administrator mode being different from the development mode, the product operation mode, and the key-generation mode; and
- developing the key-generation program and encrypting the developed key-generation program with any key on the administrator LSI device.

8. A program development supporting system for supporting development of an encrypted program which is to be installed in a system having an LSI device, the LSI device having a secure memory which includes an unrewritable area, the system comprising:
- a development LSI device having the same structure as that of the LSI device on which the encrypted program runs; and
- an external memory for storing a raw (binary) program, wherein
- the development LSI device includes a secure memory for storing encrypted common key information regarding a raw common key different from an inherent and permanent key used for product operation mode, which is implemented in the LSI device in advance, and
- the development LSI device is capable of executing
  - a first step of obtaining the raw common key from the common key information stored in the secure memory, and
  - a second step of encrypting the raw (binary) program input from the external memory using the raw common key.

9. A program development supporting system for supporting development of an encrypted program, comprising:
- a development LSI device having the same structure as that of an LSI device on which the encrypted program runs; and
- an external memory for storing a raw (binary) program, wherein
- the development LSI device includes a secure memory for storing common key information regarding a raw common key, and
- the development LSI device is capable of executing
  - a first step of obtaining the raw common key from the common key information stored in the secure memory, and
  - a second step of encrypting the raw (binary) program input from the external memory using the raw common key,
- wherein:
  - the common key information includes an encrypted common key which is obtained by encrypting the raw common key with a raw first intermediate key and an encrypted first intermediate key which is obtained by encrypting the raw first intermediate key with a second intermediate key; and
  - the first step includes the step of obtaining the raw common key using the encrypted common key, the encrypted first intermediate key and a program encryption seed.

10. A program development supporting system for supporting development of an encrypted program which is to be installed in a system having an LSI device, the LSI device having a secure memory which includes an unrewritable area, the system comprising:
- a development LSI device having the same structure as that of an LSI device on which the encrypted program runs; and
- an external memory for storing a raw (binary) program, wherein
- the development LSI device includes
  - a secure memory for storing encrypted common key information regarding a raw common key different from an inherent and permanent key used for product operation mode, which is implemented in the LSI device in advance, and
  - a boot ROM for storing a boot program, and
- by executing the boot program stored in the boot ROM, the development LSI device executes
  - a first step of obtaining a raw common key from the common key information stored in the secure memory, and
  - a second step of encrypting the raw (binary) program input from the external memory using the raw common key.

11. A program development supporting system for supporting development of an encrypted program, comprising:

a development LSI device having the same structure as that of an LSI device on which the encrypted program runs; and an external memory for storing a raw (binary) program, wherein the development LSI device includes
- a secure memory for storing common key information regarding a raw common key, and
- a boot ROM for storing a boot program, and by executing the boot program stored in the boot ROM, the development LSI device executes
- a first step of obtaining a raw common key from the common key information stored in the secure memory, and
- a second step of encrypting the raw (binary) program input from the external memory using the raw common key, wherein:
- the common key information includes an encrypted common key which is obtained by encrypting the raw common key with a raw first intermediate key and an encrypted first intermediate key which is obtained by encrypting the raw first intermediate key with a second intermediate key; and
- the first step includes the step of obtaining the raw common key using the encrypted common key, the encrypted first intermediate key and a program encryption seed.

12. The method of claim 1, wherein the inherent and permanent key information is not outputted from the LSI device in both the development mode and the product operation mode.

* * * * *